United States Patent [19]
Okamura et al.

[11] Patent Number: 6,061,103
[45] Date of Patent: May 9, 2000

[54] IMAGE DISPLAY APPARATUS

[75] Inventors: Toshiro Okamura; Seiichiro Tabata, both of Hachioji, Japan

[73] Assignee: Olympus Optical Co., Ltd., Tokyo, Japan

[21] Appl. No.: 08/589,706

[22] Filed: Jan. 22, 1996

[30] Foreign Application Priority Data

Jan. 20, 1995 [JP] Japan ................................. 7-007189
Jun. 27, 1995 [JP] Japan ................................. 7-160443

[51] Int. Cl.⁷ ........................... H04N 5/74; G02F 1/00
[52] U.S. Cl. ..................... 348/767; 348/762; 345/32; 359/495; 359/303; 359/497
[58] Field of Search ........................... 348/795, 759, 348/767, 762, 752, 758; 349/196, 76, 96, 117, 200; 359/39, 53, 63, 73, 94, 494, 495, 484, 279, 301, 303, 497; 345/149, 32, 213, 100, 79, 54, 31, 108; H04N 5/74, 9/31

[56] References Cited

U.S. PATENT DOCUMENTS

| | | | |
|---|---|---|---|
| 4,652,928 | 3/1987 | Endo et al. | 348/219 |
| 5,369,266 | 11/1994 | Nohda et al. | 359/93 |
| 5,537,256 | 7/1996 | Fergason | 359/495 |
| 5,689,283 | 11/1997 | Shirochi | 345/132 |

FOREIGN PATENT DOCUMENTS

| | | |
|---|---|---|
| 62-191817 | 8/1987 | Japan . |
| 4-63332A | 2/1992 | Japan . |
| 4-113308A | 4/1992 | Japan . |
| 5-289044A | 11/1993 | Japan . |
| 7-13163A | 1/1995 | Japan . |

*Primary Examiner*—Michael Lee
*Attorney, Agent, or Firm*—Stevens, Davis, Miller & Mosher, L.L.P.

[57] ABSTRACT

An image display apparatus for use in head-mounted image display apparatus is disclosed. The apparatus comprises an image display element having a plurality of pixels arrayed in matrix, for displaying images by scanning these pixels with image signals; a pixel shifting means provided so as to divide these image display elements into a plurality of regions in a direction orthogonal to the scanning direction of the image signal, for selectively shifting viewing positions of the displayed images in respective regions; and a control means for controlling shifting operation at the viewing positions of the displayed images in corresponding regions of the pixel shifting means, in synchronism with the scanning of the image display elements.

28 Claims, 43 Drawing Sheets

FIG_5

FIG_8
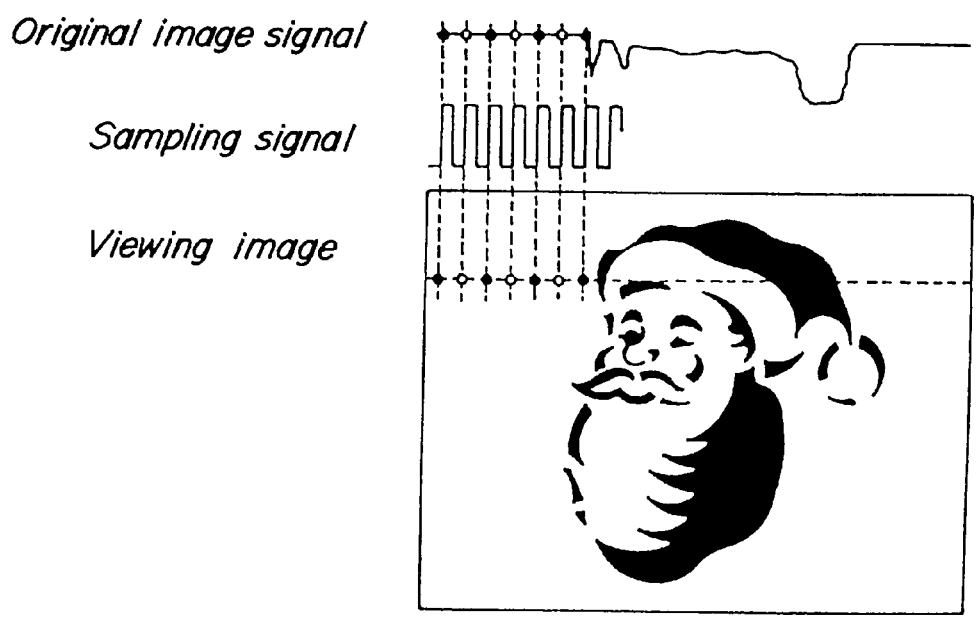

FIG_9
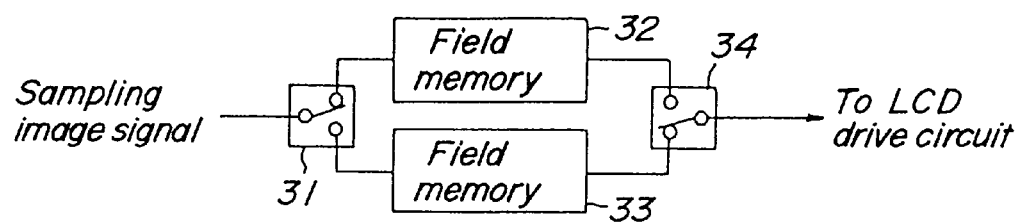

FIG_12
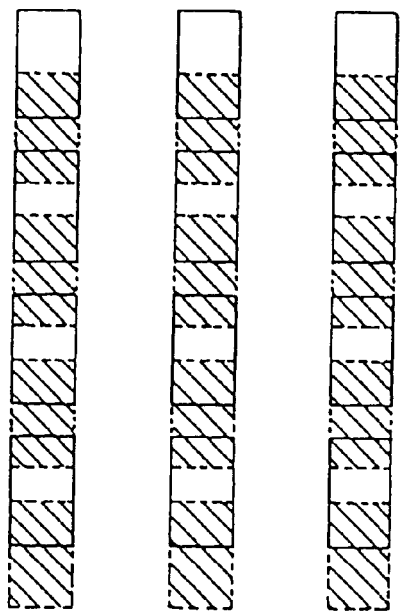
FIG_13
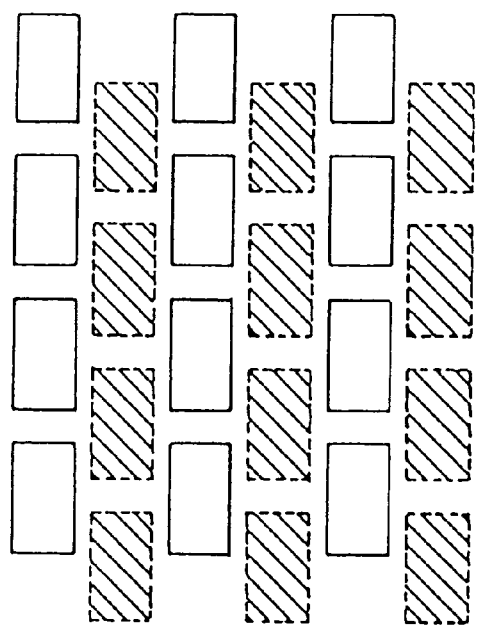

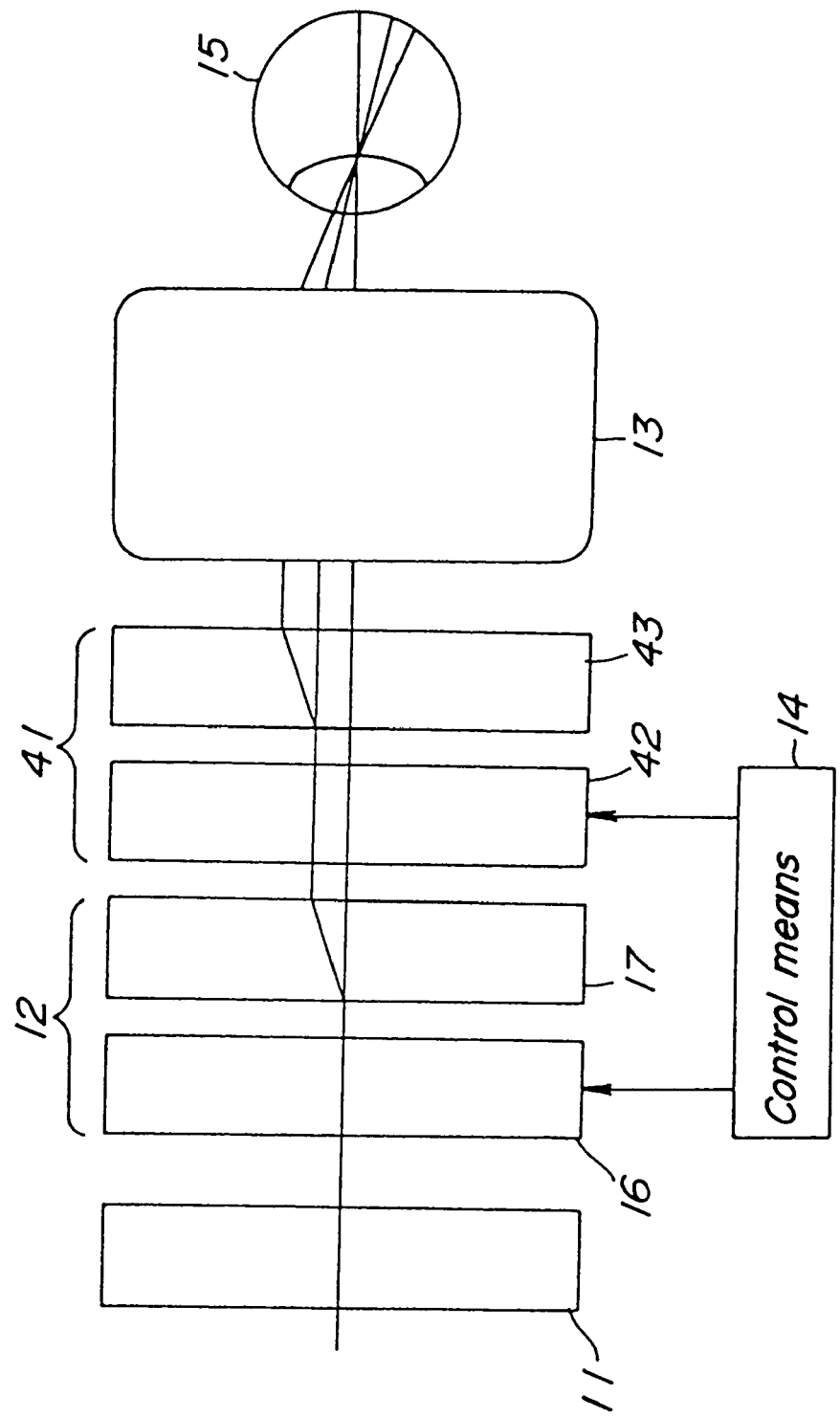
FIG_14

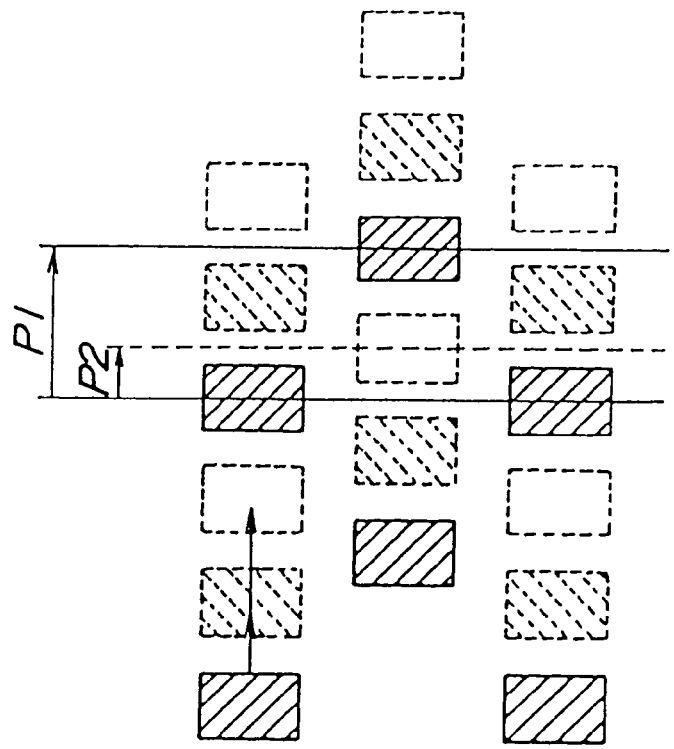
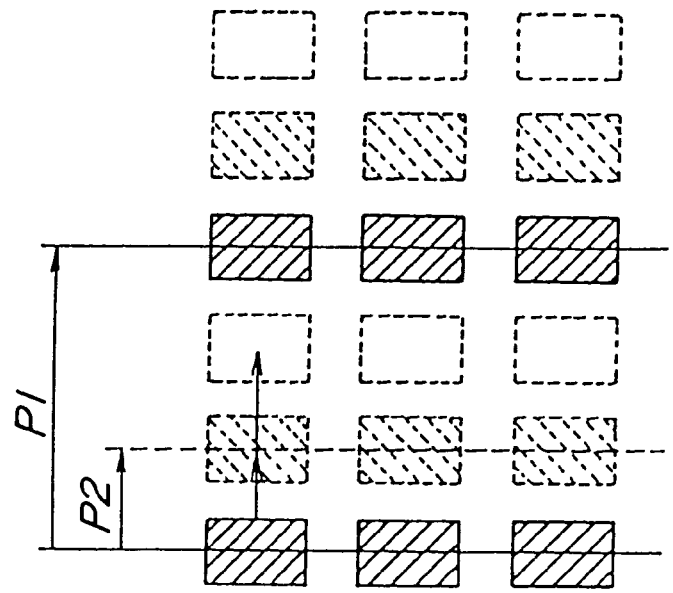
FIG.16A
FIG.16B

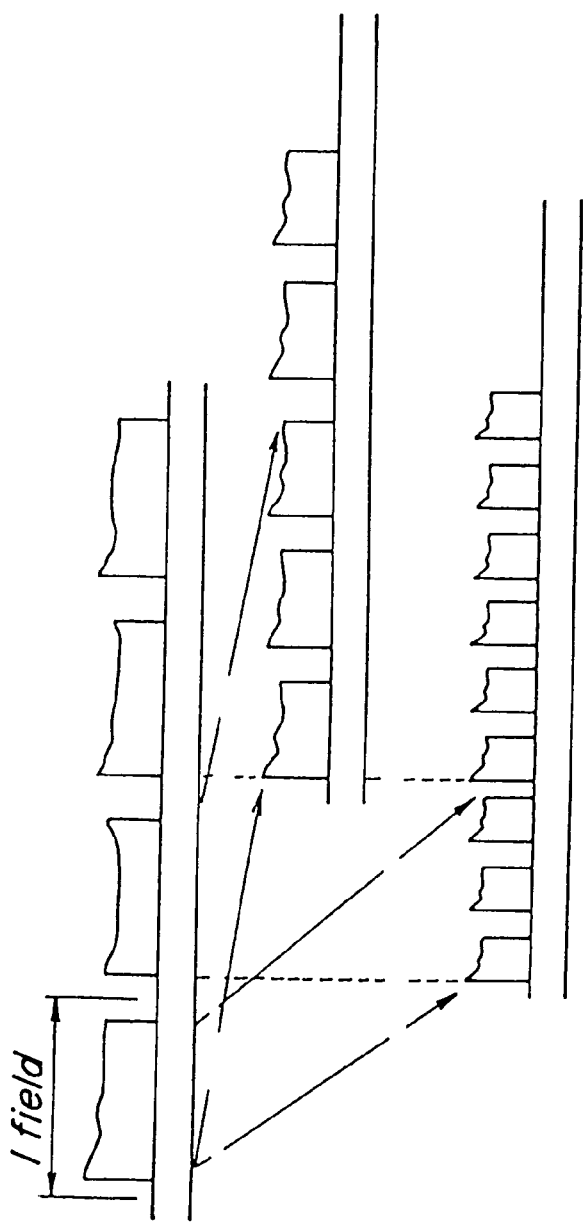

FIG_18
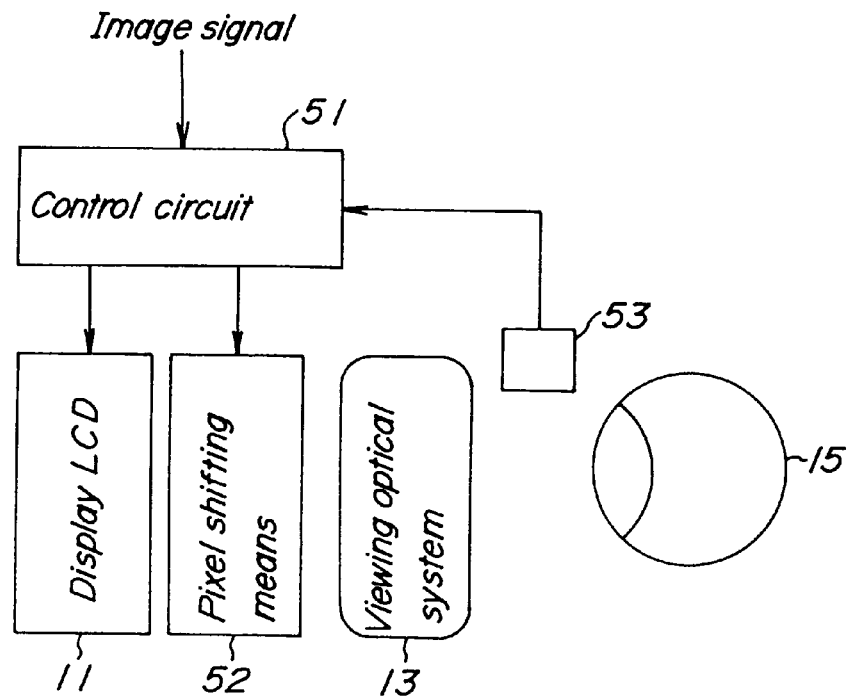
FIG_19
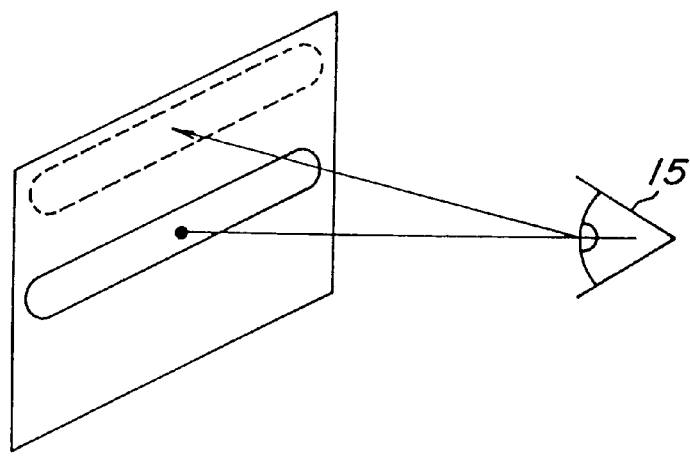

FIG_21
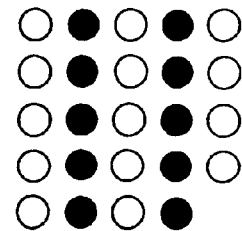
FIG_22A
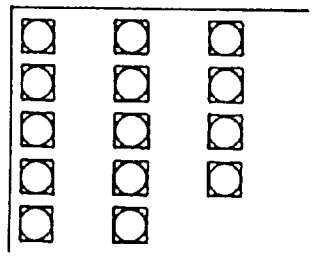
FIG_22B
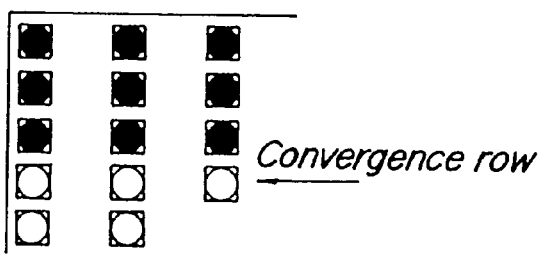
Convergence row
FIG_22C
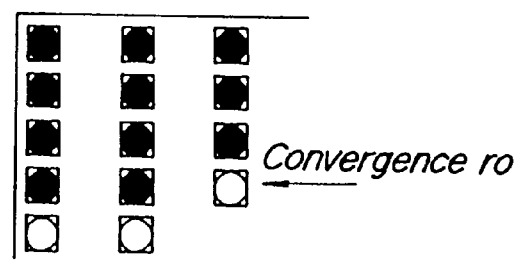
Convergence row
FIG_22D
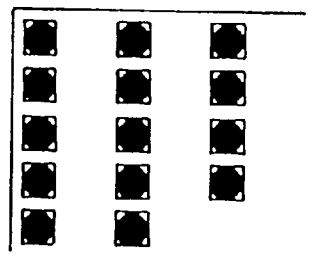

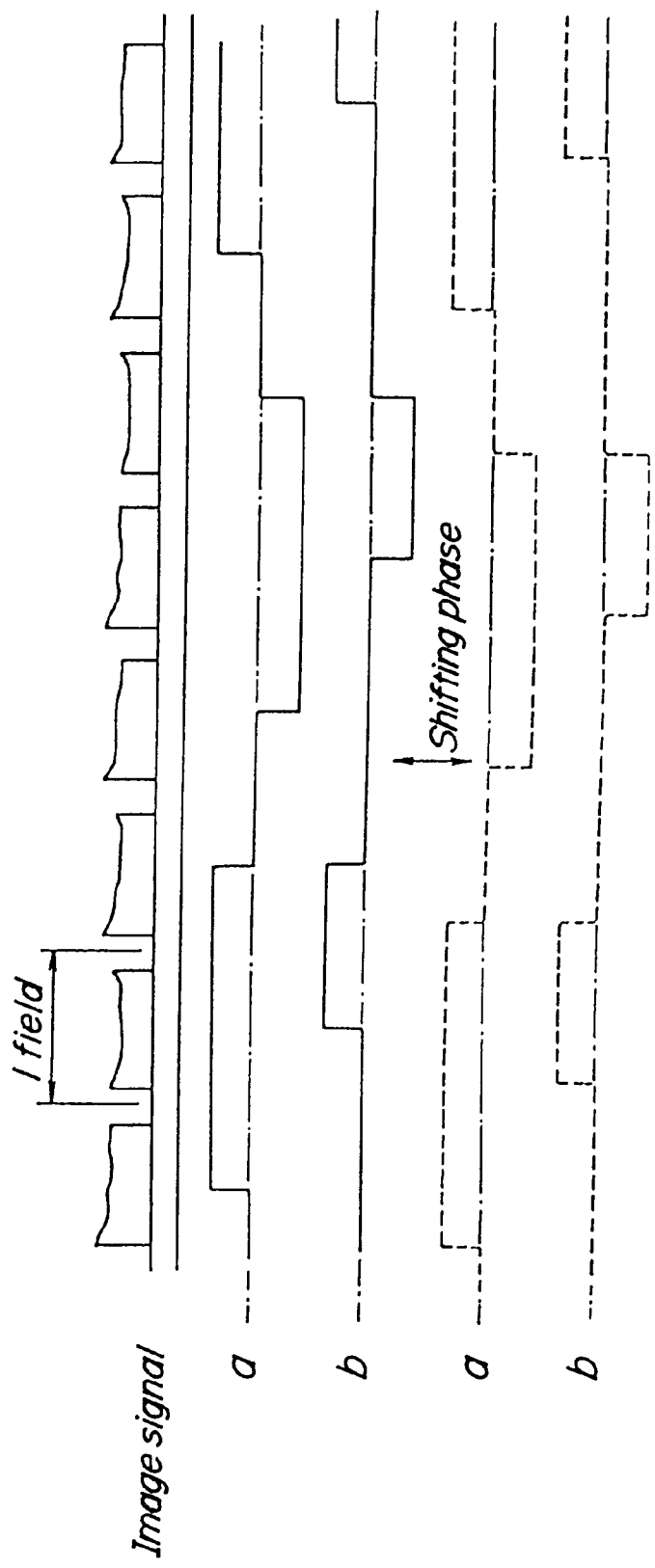

FIG_25
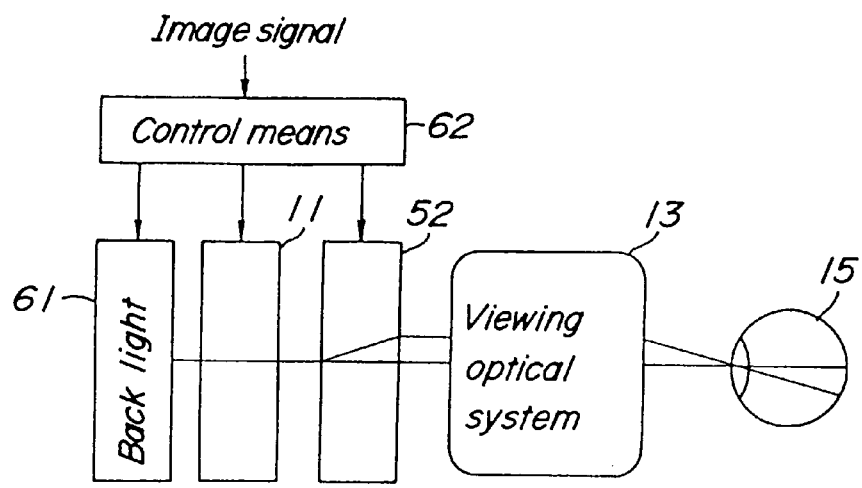
FIG_26
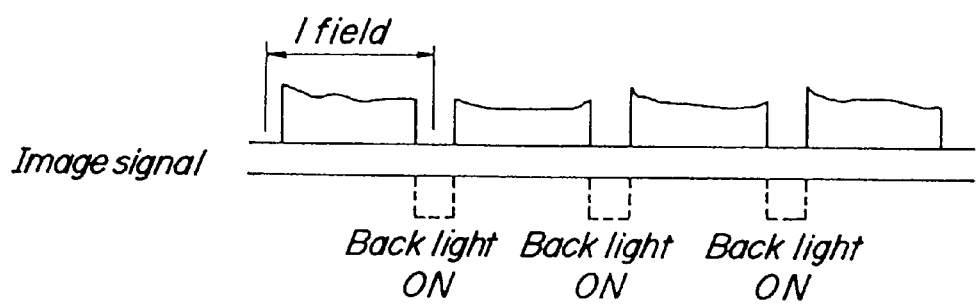

FIG_27
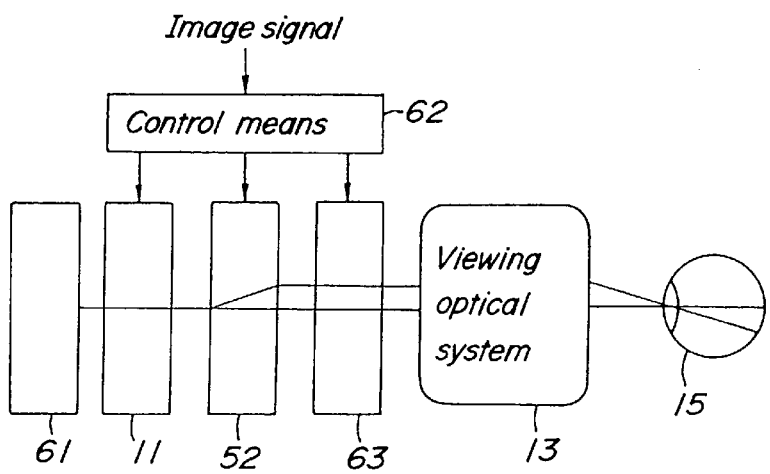
FIG_28
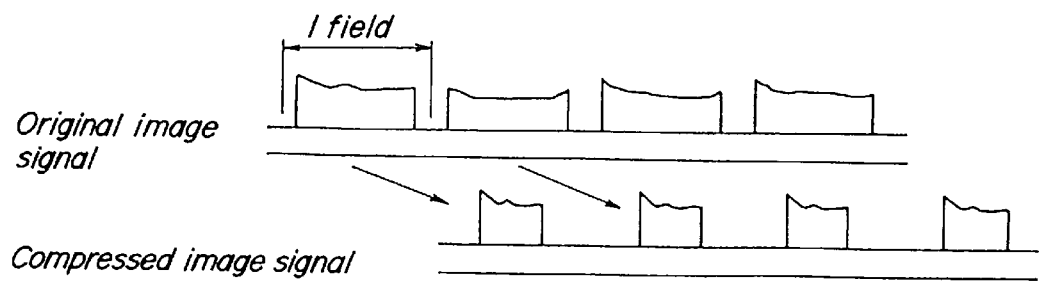

FIG_29
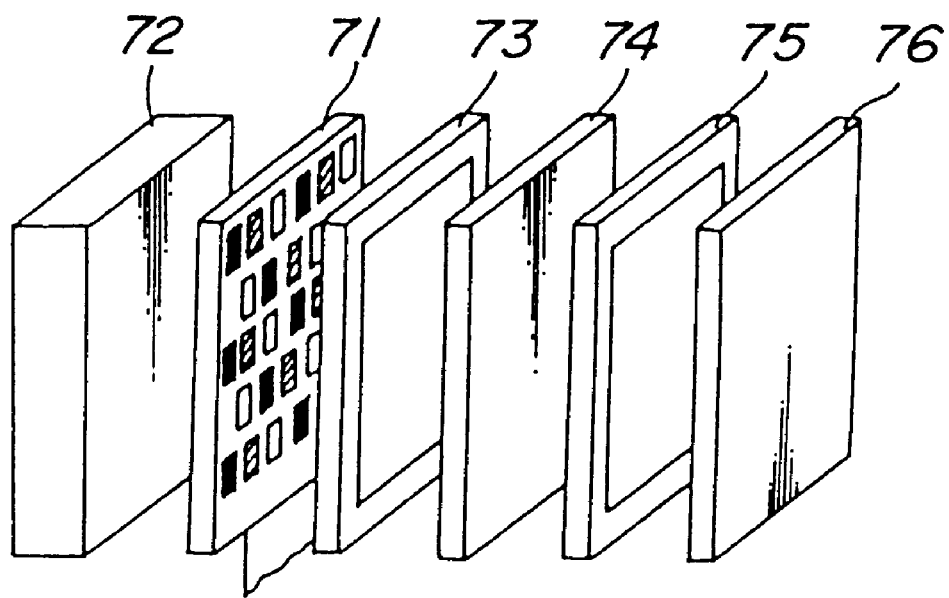

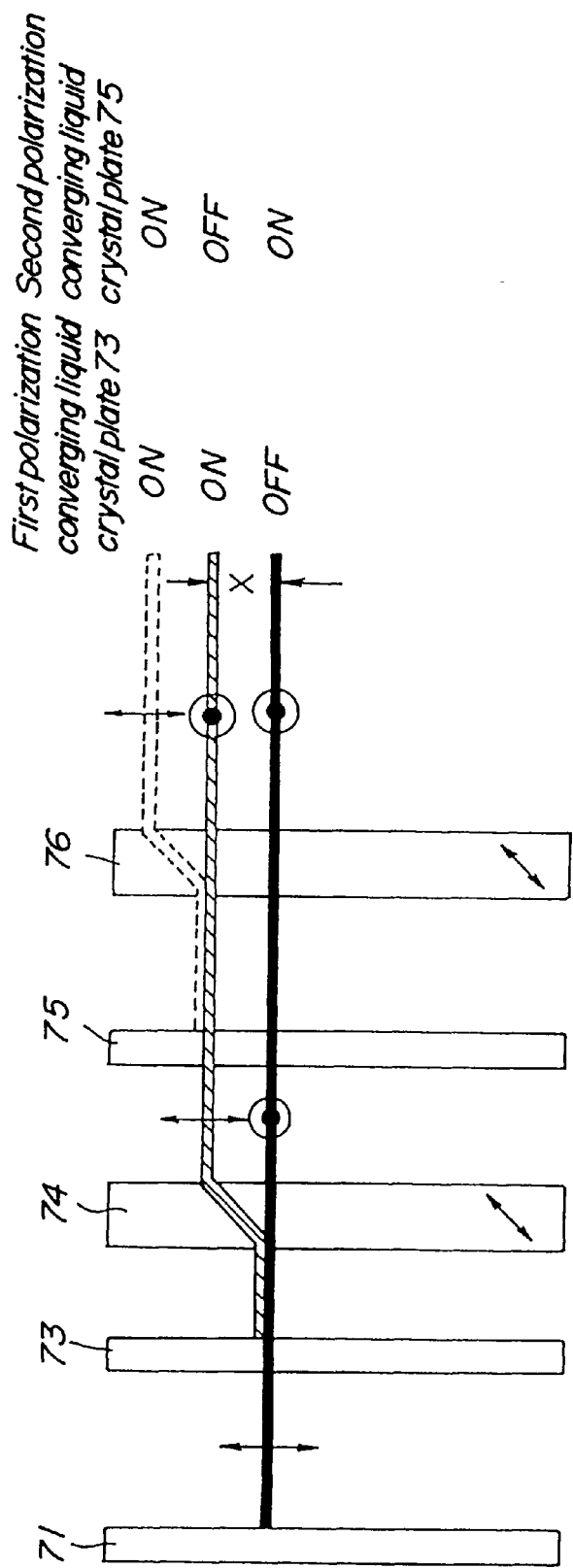

FIG.31A  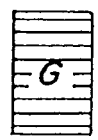  
FIG.31B   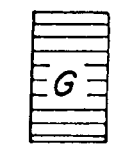 
FIG.31C    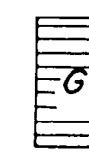

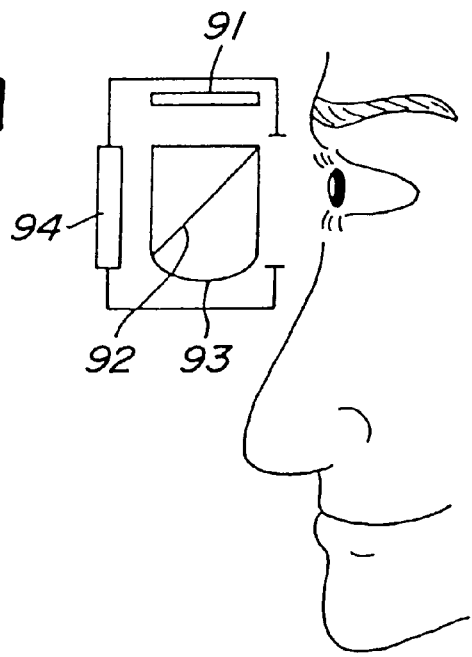
FIG_33A
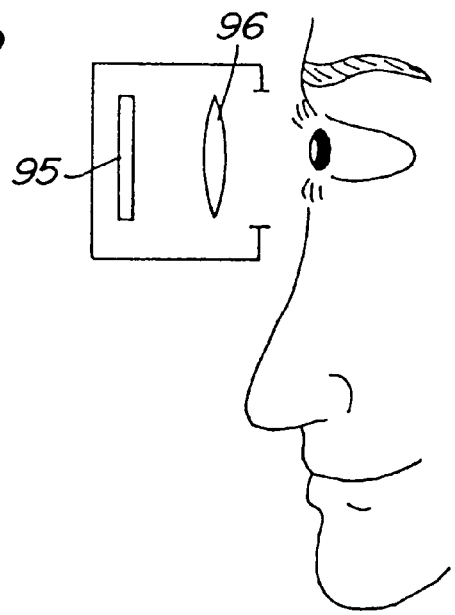
FIG_33B

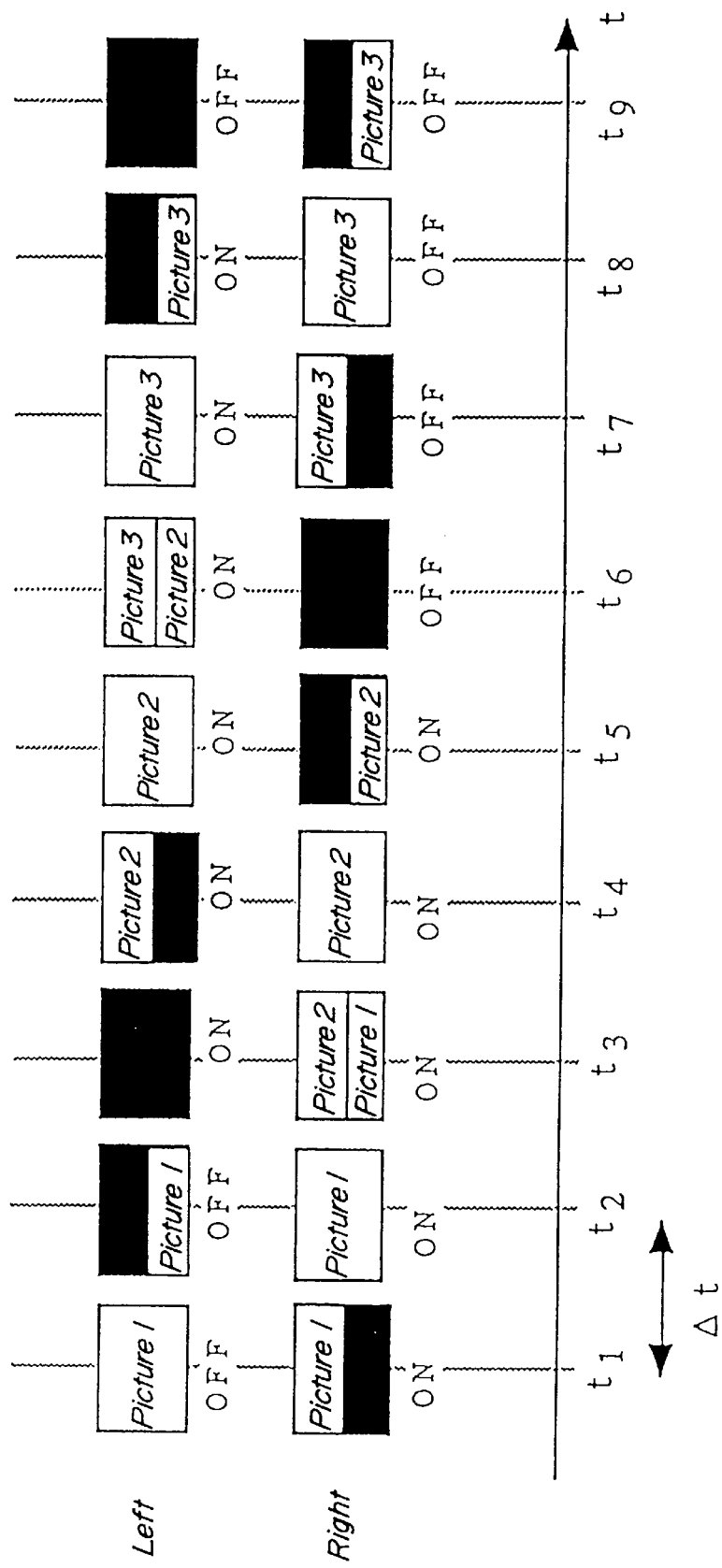
FIG_38

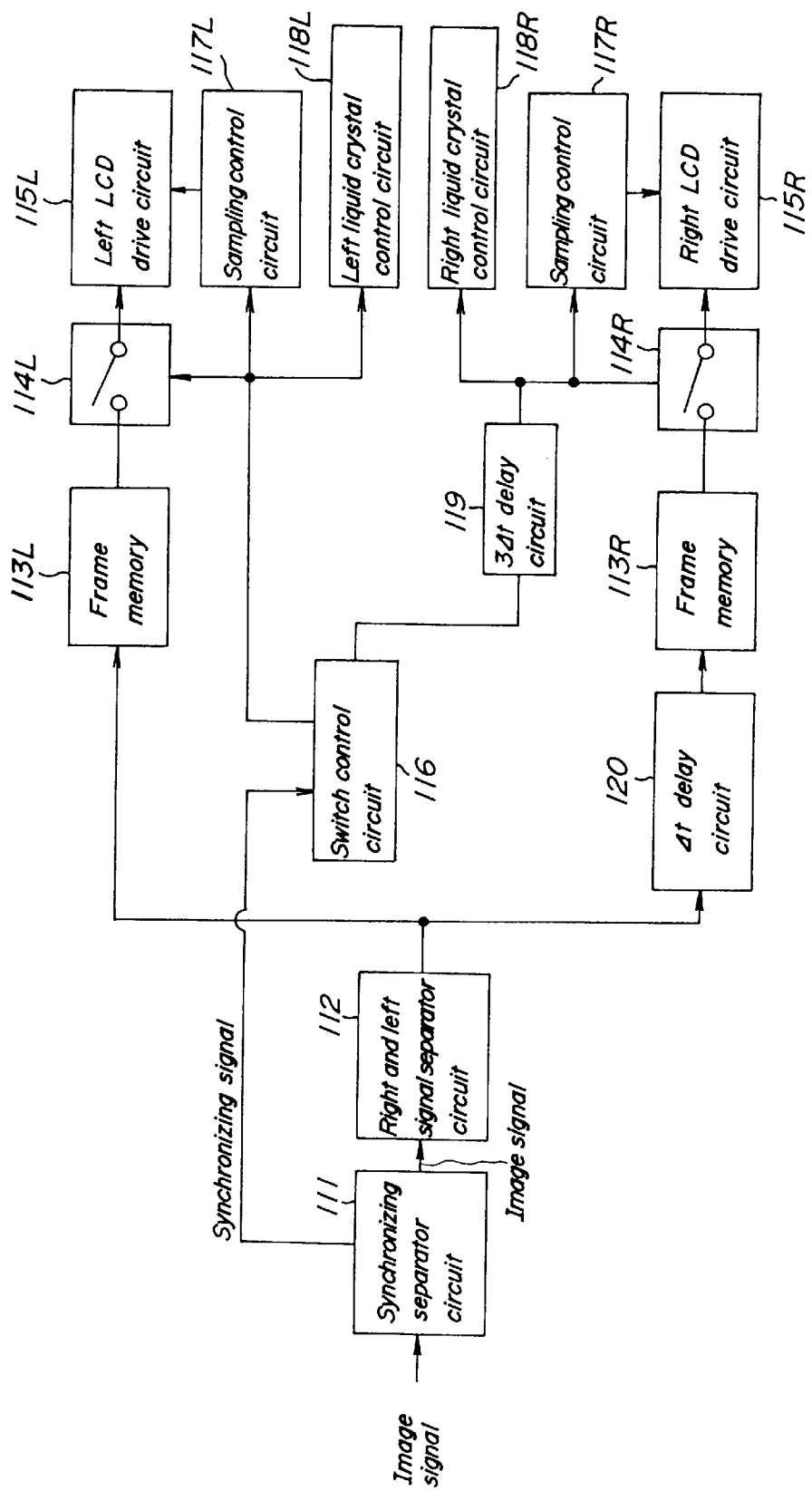
FIG._39

FIG_40
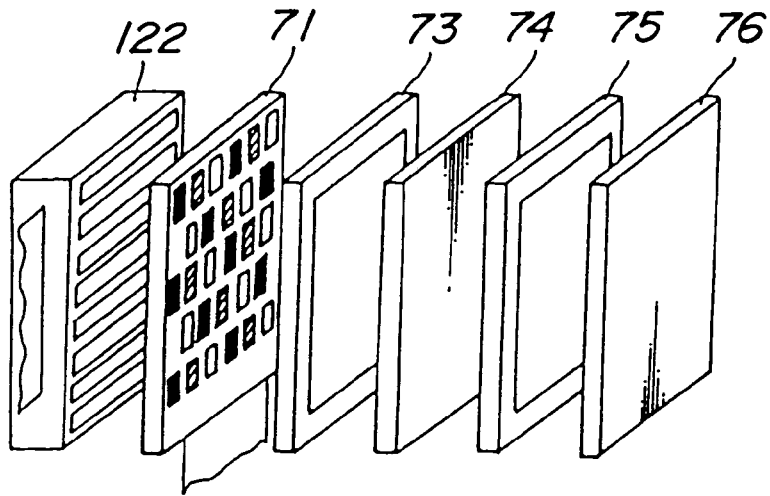
FIG_41
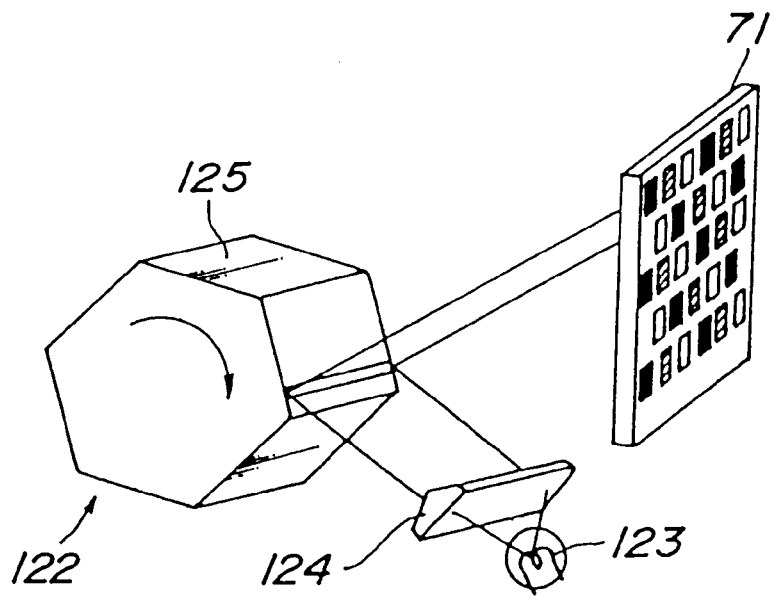

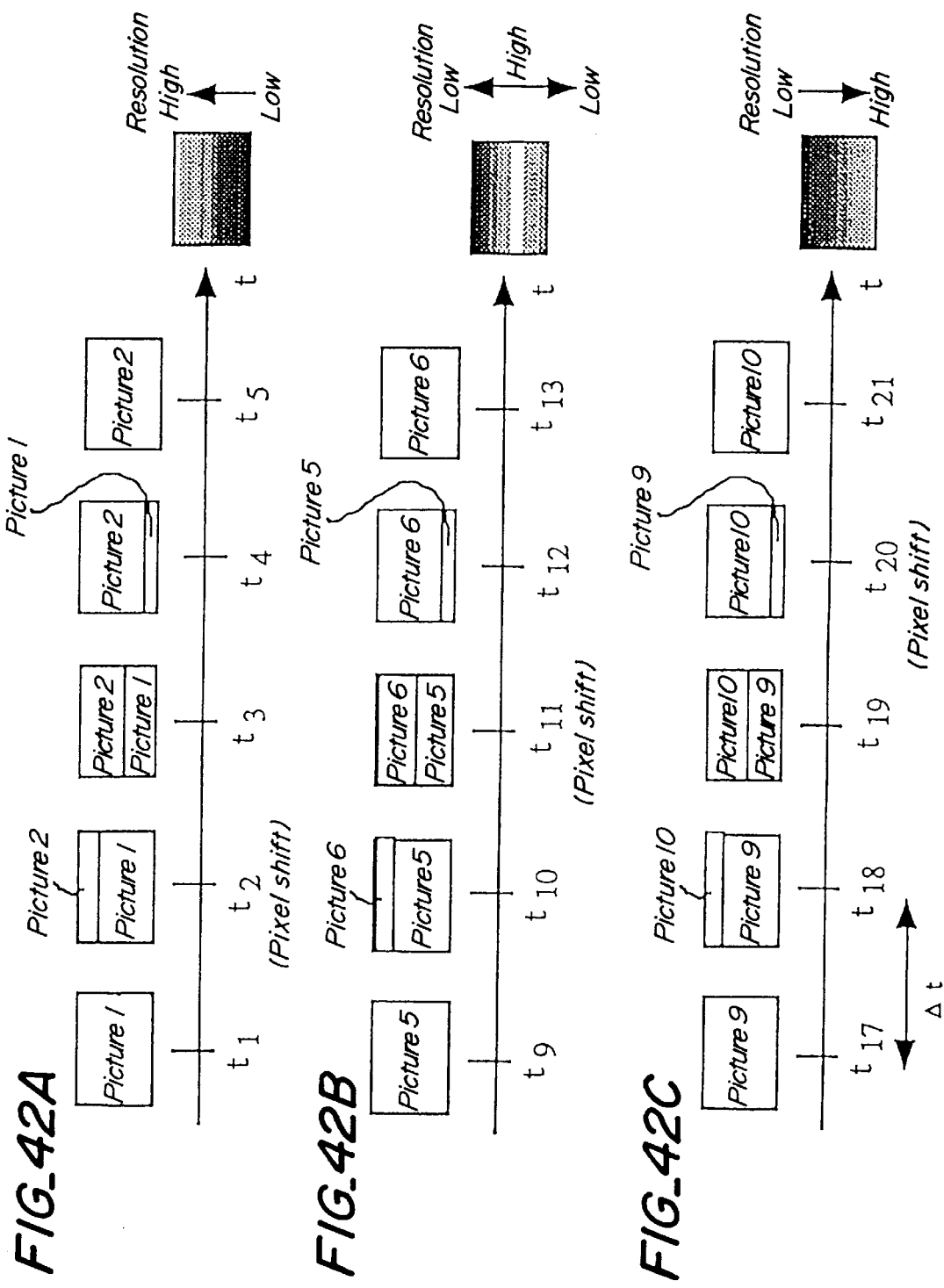

FIG_47
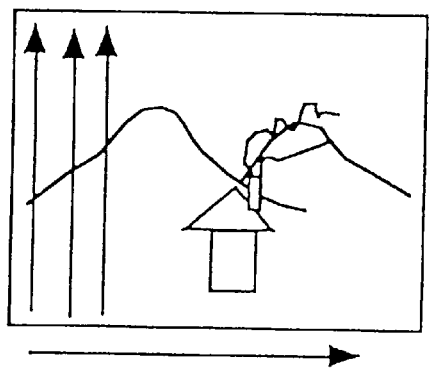
FIG_48
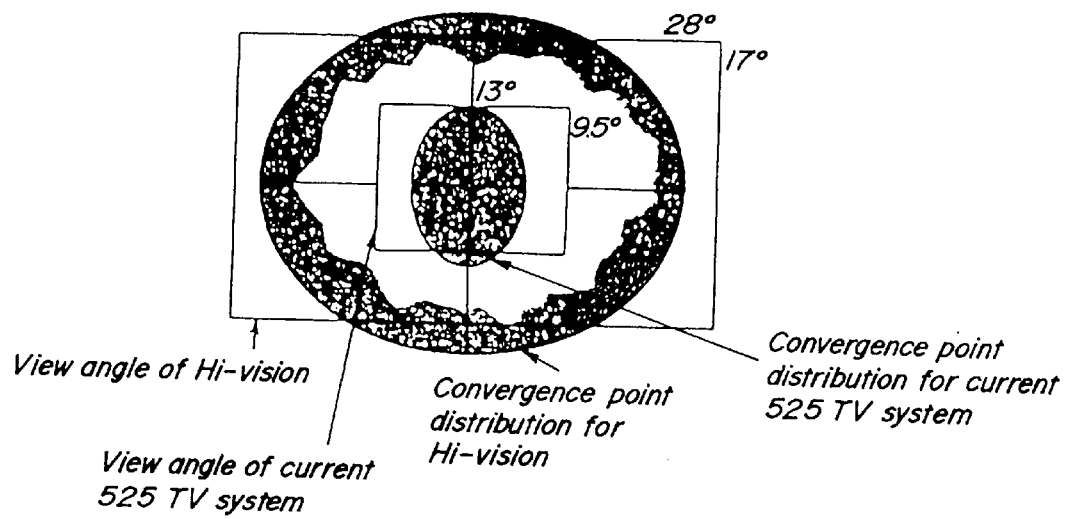

FIG_49
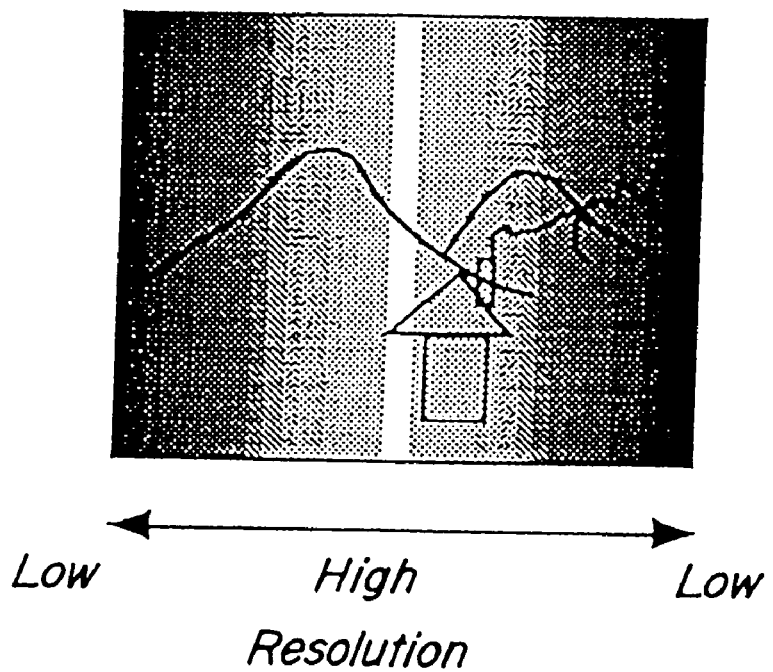
Low ←  High  → Low
Resolution

FIG_50
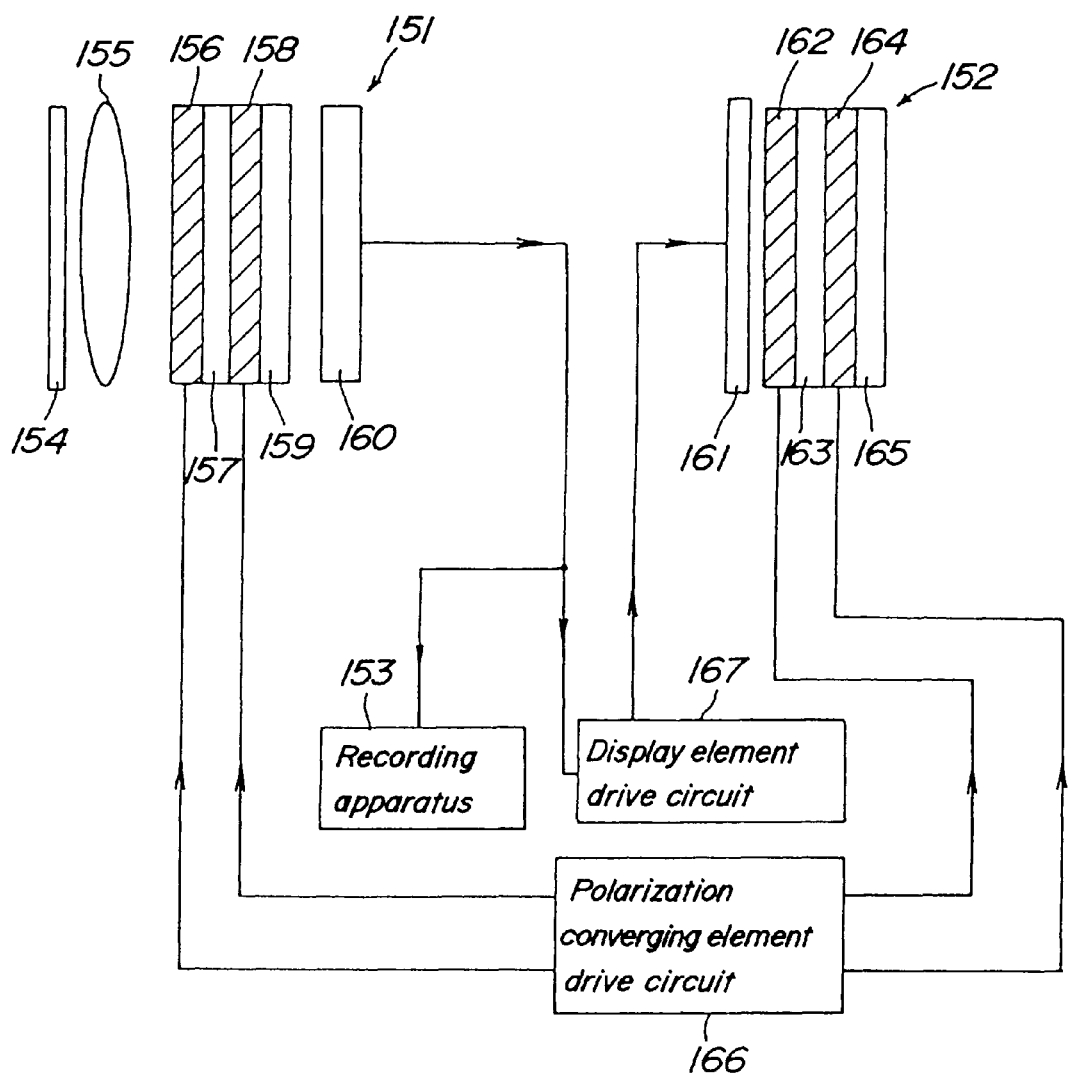

IMAGE DISPLAY APPARATUS

BACKGROUND OP THE INVENTION

1. Field of the Invention

The present invention relates to a display apparatus, more particularly, an image display apparatus.

2. Related Art Statement

As a conventional image display apparatus, the image display apparatus shown in FIG. 51 is disclosed in Japanese Patent Application Laid open No. 113,308/92. In this apparatus, a liquid crystal panel 2 for controlling a polarizing direction and a quartz plate 3 are arranged in front of the displaying surface side of a display liquid crystal panel 1 to display an original image in which the number of pixels in the horizontal direction is twice as the number of pixels of the display liquid crystal panel 1. To this end, in this image display apparatus, image signals in one image plane are thinned out every one pixel in the horizontal direction by a distributor 4 to decompose into images of two fields and to store them in frame memories 5 and 6. Images of respective fields stored in the memories 5 and 6 are read out every field with the use of a synchronous signal generator 7 and supplied and displayed on the display liquid crystal panel 1. At the same time, a required voltage is selectively applied to the liquid crystal panel 2 by a drive voltage generator 8 operated in synchronism with the read out of the image.

That is, in case of displaying the field image stored in the frame memory 5, a voltage is applied to the liquid crystal panel 2 for controlling a polarizing direction, and the image displayed on the display liquid crystal panel 1 is transmitted without rotating its rotating (polarizing) direction, and further transmitted to the quartz plate 3 as an ordinary ray, so that viewing the display liquid crystal panel 1 from the side of the quartz plate 3, as shown in FIG. 52A, the image is displayed at an ordinal pixel position (first position) of the display liquid crystal panel 1. In case of displaying the field image stored in the frame memory 6, also the applied voltage to the liquid crystal panel 2 is made off-condition and the image displayed on the display liquid crystal panel 1 is rotated by 90° in its polarizing direction and transmitted to the quartz plate 3 as an extraordinary ray, thereby, as shown in FIG. 52B, displaying the image at the position in which respective pixels of the display liquid crystal panel 1 are shifted by a ½ pixel pitch in the horizontal direction from the ordinal pixel position, (second position), viewing the display liquid crystal panel 1 from the side of the quartz plate 3.

In this way, in the conventional image display apparatus shown in FIG. 51, one image plane is divided into two fields, a first field is displayed at the first position and a second field is displayed at the second position; this operation is performed with high speed, thereby interpolating the distance between pitch of pixels of the display liquid crystal panel 1 in the horizontal direction, as shown in FIG. 52C, resulting in an improvement of resolution.

In the liquid crystal panel, however, as a pixel array suitable for displaying the image, generally, a pixel array, referred to as a delta array, in which pixels are disposed by shifting there every line so as to interpolate pixels in the horizontal direction, is commonly utilized, so that even by adopting, in such a delta array, the above method of interpolating the distance between pitches of pixels, resolution can not be improved.

In the above conventional display apparatus, also, the quartz plate 3 is utilized to shift the pixel position to be observed by ½ pixel pitch, selectively, so that the working becomes difficult and thus the cost becomes high. Furthermore, the apparatus becomes large.

Moreover, in displaying the image on the liquid crystal panel, generally, the pixels arrayed in matrix are raster-scanned and also the liquid crystal has a memory effect in which afterimage occurs, so that as in the above conventional image display apparatus, if the pixels are shifted and displayed every field, for example, if the pixels are shifted from the first position to the second position and displayed, the first field image at the first position is displayed on the second field non-displayed region at the second position by the memory effect of liquid crystal, thereby decreasing resolution. Therefore, required object can not be attained.

As in the above conventional example, if image signals in one picture plane are divided or decomposed into two field images to interpolate pixel pitches, two expensive frame memories are required, so that the cost of whole apparatus becomes high.

Such a problem arises in the same manner as the above, even if display elements, such as plasma display, EL, photochromics or the like having pixels arrayed in matrix are utilized, as long as the case that images are displayed with the use of liquid crystal.

SUMMARY OF THE INVENTION

It is an object of the present invention to resolve the above described problems of the conventional display apparatus.

It is another object of the present invention to provide a display apparatus suitably constructed to obtain an observing image with high resolution, even though the apparatus has the delta arrayed pixels as in the general liquid crystal.

It is other object of the present invention to provide a display apparatus with downsizable, simple and inexpensive construction.

It is further object of the present invention to provide a display apparatus capable of obtaining observing image with high resolution, even the case in which image has memory effect in which afterimage occurs, as in the liquid crystal.

It is further object of the present invention to provide a display apparatus constructed in such a manner that whole apparatus becomes inexpensive.

According to a first aspect of the present invention, there is provided an image display apparatus comprising:

an image display element having a plurality of pixels arrayed in matrix and divided into a plurality of regions, for displaying images by scanning these pixels with image signals;

a first pixel shifting means for selectively shifting optical axes of images in respective regions;

a second pixel shifting means having the same shifting amount as that of the first pixel shifting means;

a viewing optical system for projecting it magnified virtual image on eyes of a viewer; and a control means for controlling a position of image displayed on the image display element in synchronism with the operation of the first and second pixel shifting means.

According to a second aspect of the present invention, there is provided an image display apparatus comprising:

an image display element having a plurality of pixels arrayed in matrix, for displaying images by scanning these pixels with image signals;

a pixel shifting means for selectively shifting viewing positions of the displayed images in these image display elements;

a sight line detecting means for detecting a sight line of a viewer which views the images displayed on the image display elements; and a control means for controlling timing of shifting operation at the viewing positions of the displayed images by the pixel shifting means, based on the output of the sight line detecting means. In this aspect, the observing position of the images displayed on the image display element is shifted by the pixel shifting means with best timing, based on the detecting position of sight line of the viewer due to the sight line detecting means, so that the resolution of the image to be viewed portion can be made highest.

According to a third aspect of the present invention, there is provided an image display apparatus comprising:

an image display element having a plurality of pixels arrayed in matrix, for displaying images by scanning these pixels with image signals;

a pixel shifting means for selectively shifting viewing positions of the displayed images in these image display elements;

an image interrupting means for selectively interrupting the viewed images displayed on the image display elements; and a control means for controlling the pixel shifting means so as to shift the viewing position of the displayed images every field, and for controlling the image interrupting means so as to be able to observe the image displayed on the image display elements. In this aspect, the observing position of the images displayed on the image display element is shifted every field by the pixel shifting means, but its image is not viewed during the scanning period of the pixel in respective fields by the image interrupting means, and thus can be viewed only during fly-back period of successive fields, so that the images of consecutive fields are not mixed, and thus the viewing images can be obtained with high resolution.

In a preferable embodiment of the apparatus according to the present invention, a time base of the image signal portion in consecutive fields of the image signal.

In a further preferable embodiment of apparatus according to the present invention, the pixel shifting means has ferrodielectric substance liquid crystal or anti-ferrodielectric substance liquid crystal, and an optical anisotropy medium.

In a further preferable embodiment of the apparatus according to the present invention, the image display elements consists of ferrodielectric substance liquid crystal or anti-ferrodielectric substance liquid crystal.

According to a fourth aspect of the present invention, there is provided a display apparatus having display elements formed by arranging a plurality of pixels generating different colors, respectively comprising;

an optical axis shifting means for selectively shifting an optical axis of the image displayed on the display elements, in proportional to an array pitch of the pixels; and an image shifting control means for selectively shifting the images displayed on the display elements in a direction opposite to the optical axis shifting direction, in synchronism with the operation of the optical axis shifting means. In this aspect, the optical axis of the images displayed on the display elements is selectively shifted in proportion to the array pitch of the pixel by the optical axis shifting means, and the images displayed on the display elements are selectively shifted in synchronism with the optical axis shifting operation and in the direction opposite to the optical axis shifting direction by the image shifting control means. In the viewing images, therefore, the images before and after the shifting are superimposed by the optical axis shifting, so that even in the case of a delta-arraying of the images, a plurality of colors can be apparently reproduced by one pixel, and thus resolution can be increased.

In a preferable embodiment of the apparatus according to the present invention, the display element has pixels of three kinds, R, G, B which are arrayed cyclically, and the optical axis shifting means shifts the optical axis so as to coincide the optical axis of pixels of R, G, B.

According to such a display apparatus, the resolution can be increased three times with the use of common full color display elements.

In a further preferable embodiment of apparatus according to the present invention, the optical axis shifting means has first and second polarization converting elements for selectively converting polarization of light, and first and second birefringent plates for shifting optical axis in accordance with polarization, these elements are arranged in the order of first polarization converting elements first birefringent plate, second polarization converting element and second birefringent plate, from surface of the display element. Therefore, not only the polarization of light incident on the first and second birefringent plates is converted by the first and second polarization converting elements, but also the optical axis can be shifted, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to a fifth aspect of the present invention, there is provided a display apparatus comprising:

a display element for displaying image;

a polarization converting means for selectively converting a birefringent plate of $TiO_2$ and for selectively shifting the optical axis of the image on the display element in accordance with polarization performed by the polarization converting means; and an image shifting control means for selectively shifting the images displayed on the display elements, in synchronism with the operation of the polarization converting means. In this aspect, the polarization of light emanated from the display elements is selectively converted by the polarization converting means, and the optical axis of the images displayed on the display elements is selectively shifted by the birefringent plate of $TiO_2$ in accordance with polarization of light. The images displayed on the display elements are selectively shifted in synchronism with the operation of the image control means by the polarization converting means. In this way, the optical axis of the images displayed on the display elements are shifted with the use of the birefringent plate of $TiO_2$, that is, by the pixel shifting, thereby performing high resolution, so that this makes working of the birefringent plate easy, and makes the apparatus compact and inexpensive, as compared with the case in which the other kinds of the apparatus are utilized, and thus the apparatus can be downsized.

In a preferable embodiment of the apparatus according to the present invention, the birefringent plate of $TiO_2$ has a crystal axis which is inclined by substantially 45° to the plane of the birefringent plate. Therefore, two optical axes emanated from the birefringent plate become parallel, so that shifting amount of two optical axes become constant, irrespective of the distance to the display elements. Therefore, the arrangement between the display element and the birefringent plate has a freedom degree.

According to a sixth aspect of the present invention, there is provided a display apparatus having a display element having a plurality of pixels arrayed in matrix, for displaying images by scanning these pixels with image signals comprising:

an optical axis shifting means for selectively shifting an optical axis of the images displayed on the display elements; and an image shifting means for selectively shifting images displayed on the display elements in synchronism with On•OFF operation of shift of the optical axis performed by the optical axis shifting means;

the images being not displayed on the display elements at the time of changing shift of the optical axis performed by the optical axis shifting means. In this aspect, the optical axis of the images displayed on the display elements is selectively shifted by the optical axis shifting means, and the images displayed on the display elements are selectively shifted in synchronism with the optical axis shifting operation by the image shifting control means, but the images are not displayed on the display elements at the time of the optical axis changing. Therefore, different images shifted to each other are not viewed simultaneously, so that even in case of using the display element having memory effects, the resolution can be effectively increased by shifting the pixels.

In a preferable embodiment of the apparatus according to the present invention, the optical axis shifting means repeats the On•OFF of the shifting operation of the optical axis in the order of ON, OFF, ON, OFF.

Therefore, the time during which the images are not displayed on the display element, can be made decreased by ½ as compared with the case in which the optical axis shifting operation is repeated in the order of ON, OFF, ON, OFF, so that flicker can effectively be suppressed.

According to a seventh aspect of the present invention, there is provided a display apparatus having an liquid crystal display element having a plurality of pixels arrayed in matrix, for displaying images by scanning these pixels with image signals comprising:

an optical axis shifting means for selectively shifting an optical axis of the images displaced on the liquid crystal display elements;

an image shifting means for selectively shifting images displayed on the liquid crystal display elements in synchronism with the operation of the optical axis shifting means; and a scanning illumination means for scanning and illuminating the liquid crystal display element in synchronism with scanning signals applied to the liquid crystal display element. In this aspect, the optical axis of the images displayed on the liquid crystal display elements is selectively shifted by the optical axis shifting means, and the images displayed on the liquid crystal display elements are selectively shifted in synchronism with the optical axis shifting operation by the image shifting control means. Moreover, the liquid crystal display elements scanned and illuminated only near the pixels, on which the scanning signals are received, by the scanning illumination means in synchronism with its scanning signals. Therefore, different images shifted to each other are not viewed simultaneously, so that the resolution can be effectively increased by shifting the pixels with the use of the liquid crystal display elements.

In a preferable embodiment of the apparatus according to the present invention, the scanning illumination means has a scanning line width which is substantially larger than 2 times and smaller than 50 times that of the liquid crystal display element.

According to such an apparatus, the scanning illumination system can be made inexpensive, while holding the effects of resolution improvement.

In a further preferable embodiment of apparatus according to the present invention, the optical axis shifting means has first and second polarization converting elements for selectively converting polarization of light, and first and second birefringent plates for shifting optical axis in accordance with polarization, these elements are arranged in the order of first polarization converting elements first birefringent plate, second polarization converting element and second birefringent plate, from surface of the display element. Therefore, not only is the polarization of light incident on the first and second birefringent plates converted by the first and second polarization converting elements, but also the optical axis can be shifted, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to an eighth aspect of the present invention, there is provided a display apparatus having a display element having a plurality of pixels arrayed in matrix, for displaying images by scanning these pixels with image signals comprising:

an optical axis shifting means for selectively shifting an optical axis of the images displayed on the display element; and an image shifting means for selectively shifting images displayed on the display elements in synchronism with the operation of the optical axis shifting means;

the change timing of On•OFF of optical axis shifting performed by the optical axis shifting means being changed for the scanning timing of images at the display element. In this aspect, the optical axis of the images displayed on the display elements is selectively shifted by the optical axis shifting means and the images displayed on the display elements are selectively shifted by the image shifting control means in synchronism with the optical axis shifting operation, but the timing of On•OFF switching of the optical shifting performed by the optical axis shifting means is changed for the timing of the optical axis shifting. Therefore, the display lines are changed with high resolution by changing the timing of optical axis changing, so that even in case of using the display element having memory effects, the resolution of whole display plane can effectively be increased by the pixel shifting.

In a preferable embodiment of the apparatus according to the present invention, the change timing of ON•OFF of optical axis shifting performed by the optical axis shifting means is of substantially ⅙, ½ and ⅚ of a rewriting period of image signals for the display element.

According to such an apparatus, the resolution of whole image plane can be increased evenly.

In a further preferable embodiment of apparatus according to the present invention, the optical axis shifting means has first and second polarization converting elements for selectively converting polarization of light, and first and second birefringent plates for shifting optical axis in accordance with polarization, these elements are arranged in the order of first polarization converting element, first birefringent plate, second polarization converting element and second birefringent plate, from surface of the display element.

Therefore, not only is the polarization of light incident on the first and second birefringent plates is converted by the first and second polarization converting elements, but also the optical axis can be shifted, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to a ninth aspect of the present invention, there is provided a display apparatus comprising:

a display element for displaying images;

an optical axis shifting means for selectively shifting an optical axis of the display elements to a first optical axis, a second optical axis and a third optical axis; and an image shifting control means for selectively shifting images displayed on the display element from a first shifting amount, a second shifting amount and a third shifting amount in synchronism with the operation of the optical axis shifting means;

the selective patterns of the first optical axis, the second optical axis and the third optical axis performed by the optical axis shifting means being successively changed. In this aspect, the optical axis of the images displayed on the display elements is selectively shifted to the first optical axis, the second optical axis and the third optical axis by the optical axis shifting means and the images displayed on the display elements are selectively shifted by the first shifting amount, the second shifting amount and the third shifting amount with the use of the image shifting control means in synchronism with the optical axis shifting operation. Therefore, even in case of using the display element having memory effects, the resolution of whole display plane can effectively be increased by the pixel shifting. Moreover, selective patterns of the first optical axis, the second optical axis and the third optical axis due to the optical axis shifting means are successively changed, so that it can effectively be possible to prevent viewing images from being generated, which is liable to arise in case of repeating predetermined order of the selecting.

In a preferable embodiment of the apparatus according to the present invention, the selective patterns of the first optical axis, the second optical axis and the third optical axis performed by the optical axis shifting means are of in the order of the first optical axis, the second optical axis, the third optical axis, the second optical axis, the first optical axis, the third optical axis, - - - .

According to such a display apparatus, the flicker of color change in the case of a color image display, can effectively be suppressed as compared with the case in which the selective patterns can be made in the other order, for example, in the order of the first optical axis, the second optical axis, the third optical axis, the third optical axis, the second optical axis, and the first optical axis.

In a further preferable embodiment of apparatus according to the present invention, the optical axis shifting means has first and second polarization converting elements for selectively converting polarization of light, and first and second birefringent plates for shifting optical axis in accordance with polarization, these elements are arranged in the order of first polarization converting element, first birefringent plate, second polarization converting element and second birefringent plate, from surface of the display element.

Therefore, not only is the polarization of light incident on the first and second birefringent plates is converted by the first and second polarization converting elements, but also the optical axis can be shifted, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to a tenth aspect of the present invention, there is provided a display apparatus having a display element having a plurality of pixels arrayed in matrix, for displaying images by scanning these pixels with image signals comprising:

an optical axis shifting means for selectively shifting an optical axis of the images displayed on the display element; and an image shifting means for selectively shifting images displayed on the display elements in synchronism with the operation of the optical axis shifting means;

the consecutive rows of the display elements being scanned in the horizontal direction by the image signals to display the images, and the optical axis of the images being shifted by the optical axis shifting means, in the way of the display scanning. In this aspect, the optical axis of the images displayed on the display elements is selectively shifted by the optical axis shifting means and the images displayed on the display elements are selectively shifted by the image shifting control means in synchronism with the optical axis shifting operation, but the display element scans and displays consecutive rows in the horizontal direction by the image signals, so that the optical axis of the images is shifted by the optical axis shifting means in the way of display scanning. Therefore, even in case of using the display element having memory effects, the resolution of whole display plane can effectively be increased by the pixel shifting, particularly, the resolution in the central region liable to attract attention in case of viewing the images by viewer can effectively be increased by performing the optical axis shifting at the time of scanning the center of the image plane.

In a preferable embodiment of the apparatus according to the present invention, the optical axis shifting means has first and second polarization converting elements for selectively converting polarization of light, and first and second birefringent plates for shifting optical axis in accordance with polarization, these elements are arranged in the order of first polarization converting element, first birefringent plate, second polarization converting element and second birefringent plate, from surface of the display element.

Therefore, not only is the polarization of light incident on the first and second birefringent plates is converted by the first and second polarization converting elements, but also the optical axis can be shifted, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to an eleventh aspect of the present invention, there is provided a display apparatus for displaying image signals from an imaging element comprising;

an imaging optical axis shifting means for selectively shifting an optical axis of incident light onto the imaging element; and a display optical axis shifting means for selectively shifting an optical axis of the image displayed on the display element. In this aspect, the optical axis of light incident onto the imaging elements is selectively shifted by the display optical axis shifting means, thereby displaying image signals from the imaging element on the display elements. Therefore, resolution of the imaging elements and display elements can be increased, respectively, without using expensive frame memory.

In a preferable embodiment of the apparatus according to the present invention, the imaging optical axis shifting means has first and second polarization converting elements for selectively converting polarization of light from an object, and first and second birefringent plates for shifting optical axis in accordance with polarization, these elements are arranged in the order of first polarization converting element, first birefringent plate, second polarization converting element and second birefringent plate, from the side of the object; and the display optical axis shifting means has third and fourth polarization converting elements for selectively converting polarization of light from the display element, and third and fourth birefringent plates for shifting optical axis in accordance with polarization, these elements are arranged in the order of third polarization converting element, third birefringent plate, fourth polarization converting element and fourth birefringent plate, from the surface of the display element.

Therefore, at the imaging element side, the polarization of light incident on the first and second birefringent plates is only converted by the first and second polarization converting elements, thereby shifting the optical axis, and at the display element side, the polarization of light incident on the third and fourth birefringent plates is only converted by the third and fourth polarization converting elements, thereby shifting the optical axis, so that the mechanical mechanism is not required and thus the apparatus can be downsized. Moreover, the reproducibility of the shifting amount of the optical axis becomes preferable, since the shifting amount of the optical axis of respective birefringent plates is determined by the thickness thereof.

According to a twelfth aspect of the present invention, there is provided a display apparatus having first and second display elements for displaying images lead on eyes of a viewer, respectively, comprising:

a first optical axis shifting means for selectively shifting an optical axis of images displayed on the first display element;

a second optical axis shifting means for selectively shifting an optical axis of images displayed on the second display element;

a first image shifting control means for selectively shifting images displayed on the first display element in synchronism with the On•OFF operation of the optical axis shifting performed by the first optical axis shifting means; and, a second image shifting control means for selectively shifting images displayed on the second display element in synchronism with the On•OFF operation of the optical axis shifting performed by the second optical axis shifting means;

the first optical axis shifting means repeating ON, OFF, ON, OFF of the optical axis shifting operation in accordance with the change of the display image plane;

the second optical axis shifting means repeating ON, OFF, ON, OFF of the optical axis shifting operation in relation to the ON, OFF, ON, OFF of the optical axis shifting operation in accordance with the change of the display image plane; and the images being not displayed on corresponding first and second optical display elements at the time of changing optical axis shifting by the first and second optical axis shifting means.

Therefore, in binocular display, the timing not displayed of the images is shifted on the right and left display elements, so that the flicker can effectively be suppressed.

According to a thirteenth aspect of the present invention, there is provided a display apparatus having a display element having a plurality of pixels arrayed in matrix, for displaying images by scanning these pixels with image signals comprising:

an optical axis shifting means for selectively shifting optical axis of images on respective regions of a display plane of the display element divided into a plurality of regions, to first optical axis, second optical axis and third optical axis; and an image shifting control means for selectively shifting the images displayed on the display elements from first shifting amount, second shifting amount and third shifting amount in synchronism with the operation of the optical axis shifting means;

the selective patterns of first optical axis, second optical axis and third optical axis performed by the optical axis shifting means being different in the consecutive regions of the display plane.

Therefore, the whole image plane can be prevented from being viewed as a flowing image plane, since selective patterns of optical axis shifting are different to each other every image regions.

According to a fourteenth aspect of the present invention, there is provided a display apparatus having first and second display elements for displaying images lead on eyes of a viewer, respectively, comprising:

a first optical axis shifting means for selectively shifting an optical axis of images displayed on the first display element to a first optical axis, a second optical axis and a third optical axis;

a second optical axis shifting means for selectively shifting an optical axis of images displayed on the second display element to a first optical axis, a second optical axis and a third optical axis;

a first image shifting control means for selectively shifting images displayed on the first display element from first shifting amount, second shifting amount and third shifting amount in synchronism with the operation of the first optical axis shifting means; and, a second image shifting control means for selectively shifting images displayed on the second display element from first shifting amount, second shifting amount and third shifting amount in synchronism with the operation of the second optical axis; shifting means;

the selective patterns of first optical axis, second optical axis and third optical axis performed by the first optical axis shifting means being different to the selective patterns of first optical axis, second optical axis and third optical axis performed by the second optical axis shifting means.

According to such a display apparatus, the flowing of the image plane can be made different on the right and left display elements, so that it is possible to prevent the flowing of the image plane from getting on his nerves in case of viewing the image by both eyes.

BRIEF DESCRIPTION OF THE DRAWINGS

FIG. 8 is an explanatory view showing sampling operation of image signals shown in the second embodiment of the image display apparatus according to the present invention;

FIG. 9 is an explanatory view showing operation of the second embodiment of the image display apparatus according to the present invention;

FIG. 12 is an explanatory view showing a third embodiment of the image display apparatus according to the present invention;

FIG. 13 is an explanatory view showing a fourth embodiment of the image display apparatus according to the present invention;

FIG. 14 is a plan view showing a fifth embodiment of a display apparatus according to the present invention;

FIGS. 16A and 16B are explanatory views showing advantageous effect in the fifth embodiment;

FIGS. 17A, 17B and 17C are explanatory views showing processing mode of the image signals in the fifth embodiment;

FIG. 18 is a plan view showing a sixth embodiment of a display apparatus according to the present invention;

FIG. 19 is an explanatory view showing the operation of the sixth embodiment of the image display apparatus according to the present invention;

FIG. 21 is an explanatory view showing the pixel shifting operation shown in the sixth embodiment of the image display apparatus according to the present invention;

FIGS. 22A, 22B, 22C and 22D are explanatory views showing consecutive displaying steps shown in FIG. 21;

FIG. 24 is an explanatory view showing modification of the sixth embodiment of the image display apparatus according to the present invention;

FIG. 25 is a plan view showing a seventh embodiment of a display apparatus according to the present invention;

FIG. 26 is an explanatory view showing the operation of the seventh embodiment of the image display apparatus according to the present invention;

FIG. 27 is a plan view showing a eighth embodiment of a display apparatus according to the present invention;

FIG. 28 is an explanatory view showing a ninth embodiment of the image display apparatus according to the present invention;

FIG. 29 is a perspective view showing a tenth embodiment of a display apparatus according to the present invention;

FIG. 30 is a plan view showing the operation of the tenth embodiment of the display apparatus according to the present invention;

FIGS. 31A–C are explanatory view showing the operation of the tenth embodiment of the display apparatus according to the present invention;

FIGS. 33A and 33B are side views showing optical systems of the head-mounted image display apparatus shown in FIG. 32;

FIG. 38 is an explanatory view showing a fourteenth embodiment of the display apparatus according to the present invention;

FIG. 39 is a block diagram showing one example of a circuit construction shown in the fourteenth embodiment of the present invention;

FIG. 40 is a perspective view showing a fifteenth embodiment of a display apparatus according to the present invention;

FIG. 41 is a perspective view showing a construction of major portion of a sixteenth embodiment of a display apparatus according to the present invention;

FIGS. 42A, 42B and 42C are explanatory views showing a seventeenth embodiment of the display apparatus according to the present invention;

FIG. 47 is a plan view showing an operation of the twentieth embodiment of a display apparatus according to the present invention;

FIG. 48 is an explanatory view showing convergence point distribution in case of viewing TV by a viewer;

FIG. 49 is an explanatory view showing resolution in the twentieth embodiment;

FIG. 50 is a plan view showing a twenty-first embodiment of a display apparatus according to the present invention;

DETAILED EXPLANATION OF THE PREFERRED EMBODIMENT

Figure 1:
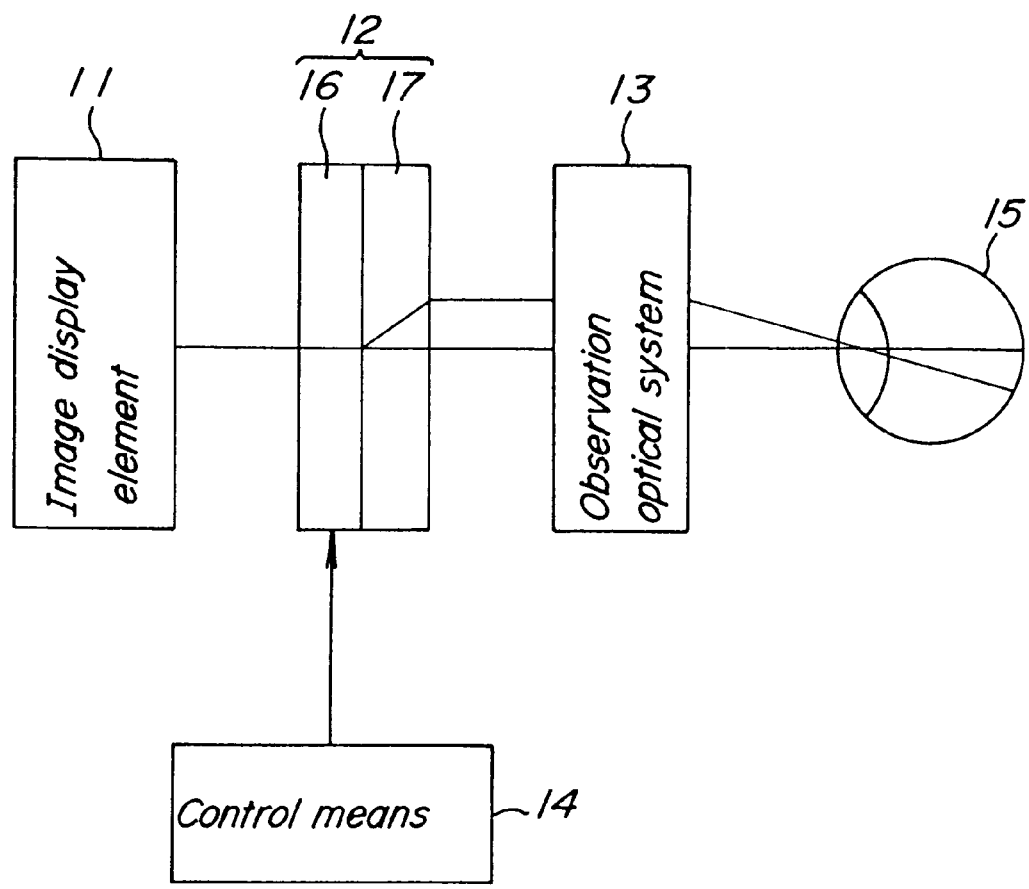
FIG. 1 is a plan view showing a first embodiment of a display apparatus according to the present invention.

Now to the drawings, there are shown various embodiments of an image display apparatus according to the present invention. Like parts are shown by corresponding reference characters throughout several views of the drawings.

FIG. 1 is a block diagram showing a first embodiment of the image display apparatus according to the invention. The image display apparatus comprises an image display element 11, a pixel shifting means 12, an observation (or viewing) optical system 13 and a control means 14. The pixel shifting means 12 is controlled by the control means 14 in synchronism with a scanning of an image signal in the image display element 11. Then, an image displayed on the image display element 11 is observed (or viewed) by a user's eye 15 by means of the pixel shifting means 12 and observation optical system 13. The user can see an enlarged imaginary image.

Figure 2:
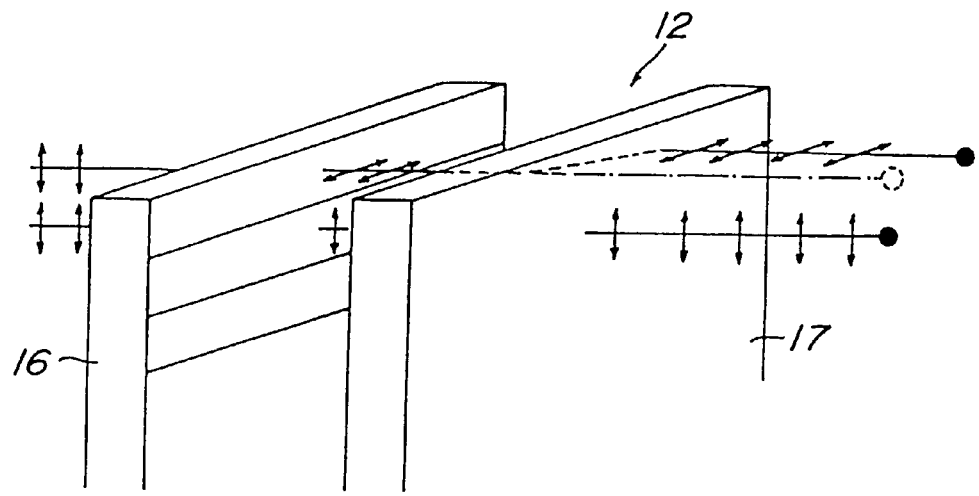
FIG. 2 is a magnified perspective view showing pixel shifting means shown in FIG. 1.

In FIG. 1, the image display element 11 is formed by an liquid crystal display panel (LCD) having a plurality of pixels arranged in matrix. As shown in FIG. 2, the pixel shifting means 12 comprises a line type liquid crystal panel 16 and a quartz plate 17 serving as an optical anisotropic material. The line type liquid crystal panel 16 rotates selectively the direction of the linear polarization of light emanating from a corresponding pixel of the display LCD element 11. Depending upon the polarization direction, a pixel on the relevant line is shifted in a direction of a line by ½ pixel pitch.

Figure 3:
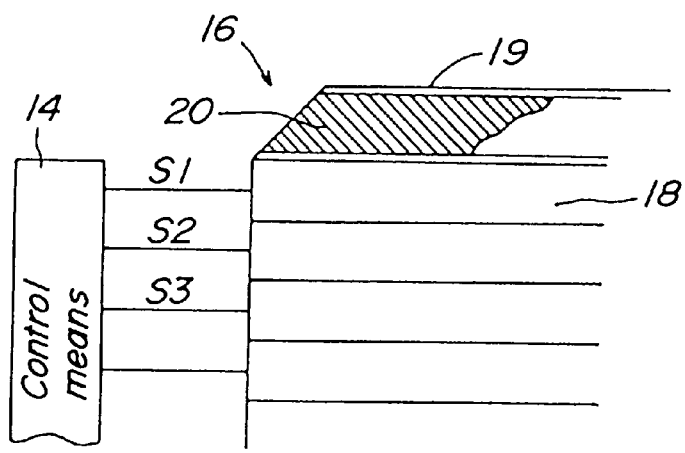
FIG. 3 is a magnified perspective view showing a construction of a line type liquid crystal shown i FIG. 2.

The line type liquid crystal panel 16 includes line electrodes corresponding to respective lines of the display LCD element 11, common electrode 19 and liquid crystal 20 filled in a space between these electrodes as illustrated in FIG. 3. The control means 14 is connected to the line electrodes 18 via signal wires si, s2, s3 - - - , and a voltage difference is applied between respective line electrodes 18 and the common electrode 19 in synchronism with the scanning of the image signal at the display LCD element 11. Therefore, the polarizing direction of the linearly polarized light emanating from the display LCD element 11 is rotated by 90 degrees.

For an odd field of the image signal of the image signal, a voltage is applied to a line-wise region of the liquid crystal 20 of the line type liquid crystal panel 16, linearly polarized light emanating from a relevant region of the display LCD element 11 is transmitted through the line-wise region without changing the polarizing direction. For an even field, a voltage applied to the line-wise region of the liquid crystal 16 is released. Then, the polarizing direction of the linearly polarized light emanating from a line-wise region of the display LCD element 11 corresponding to the relevant line-wise region of the lines type liquid crystal panel 16 is rotated by 90 degrees. In this manner, the pixels on successive lines are shifted in the horizontal direction. It should be noted that the liquid crystal 20 may be advantageously formed by ferrodielectric liquid crystal or anti-ferrodielectric liquid crystal having high response speed and memory function.

Figure 4:
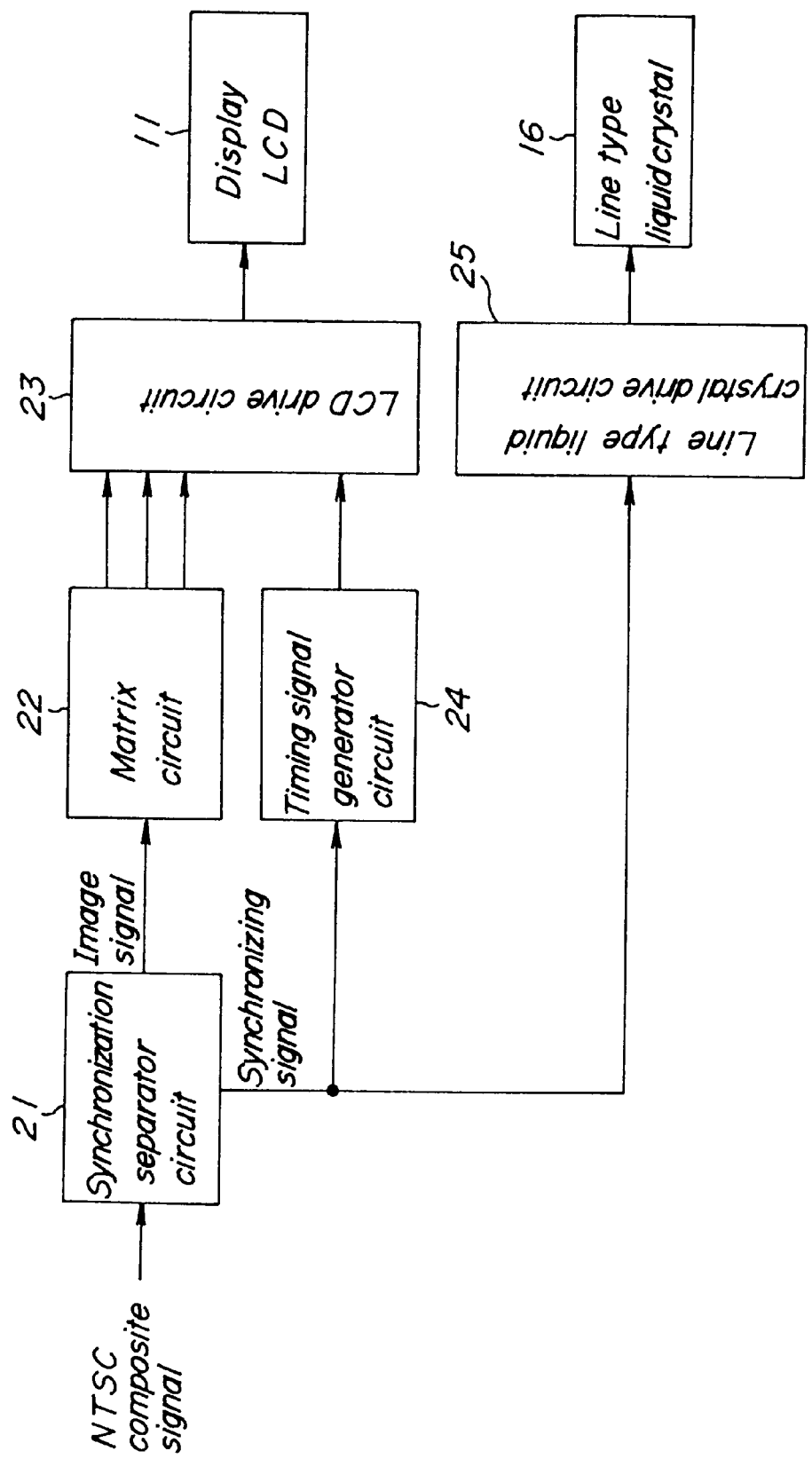
FIG. 4 is a block diagram showing a circuit construction in case of displaying NTSC composite signals by image display apparatus shown in FIG. 1.

FIG. 4 is a block diagram depicting an embodiment of the image display apparatus for displaying an NTSC composite signal. The NTSC composite signal is supplied to a synchronization separator circuit 21 and a synchronizing signal is separated from an image signal. The thus separated image signal is supplied to an LCD driving circuit 23 via a matrix circuit 22. The synchronizing signal is supplied to a timing signal generator circuit 24 as well as to a line type liquid crystal drive circuit 25.

Figure 5:
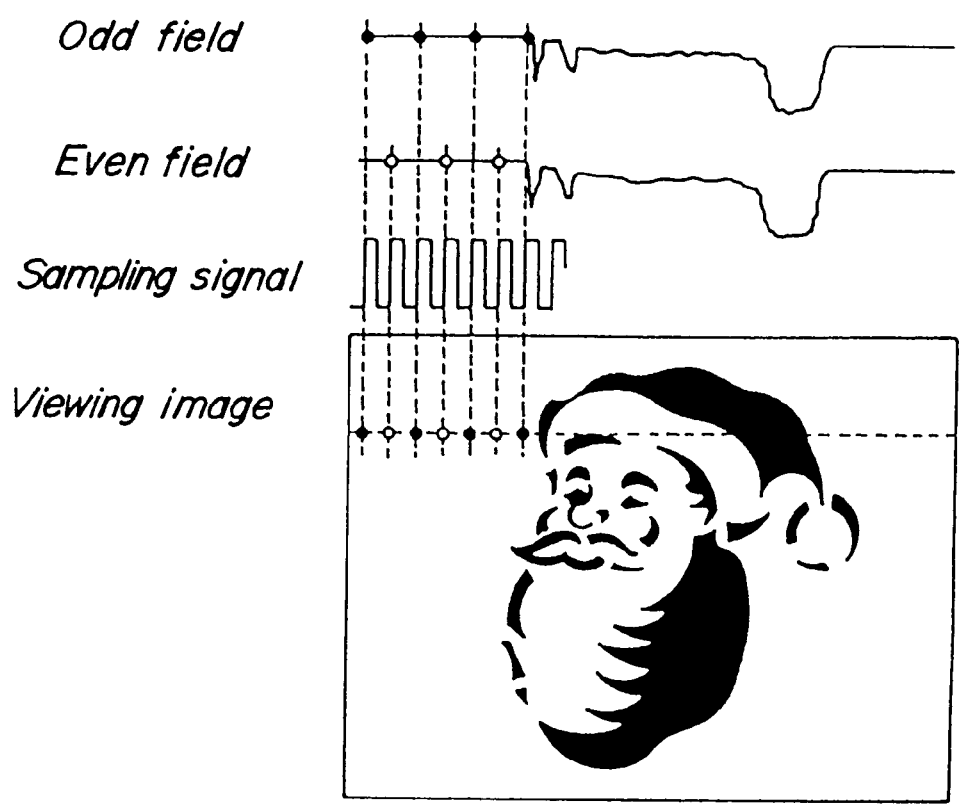
FIG. 5 is an explanatory view showing sampling operation of image signals shown in FIG. 4.

In the present embodiment, each of analog image signals of odd and even fields of the NTSC composite signal is displayed by using a whole number of pixels of the display LCD element 11. To this end, a sampling signal is generated from the timing signal generator circuit 24 on the basis of the synchronizing signal, and the image signals on respective lines are sampled by this sampling signal in the LCD drive circuit 23 and the thus sampled signal is supplied to the display LCD element 11. As shown in FIG. 5, in an odd field, the image signal on respective lines is sampled at positions denoted by black dots and in an even field, the image signal is sampled at positions represented by white circles.

Figure 6:
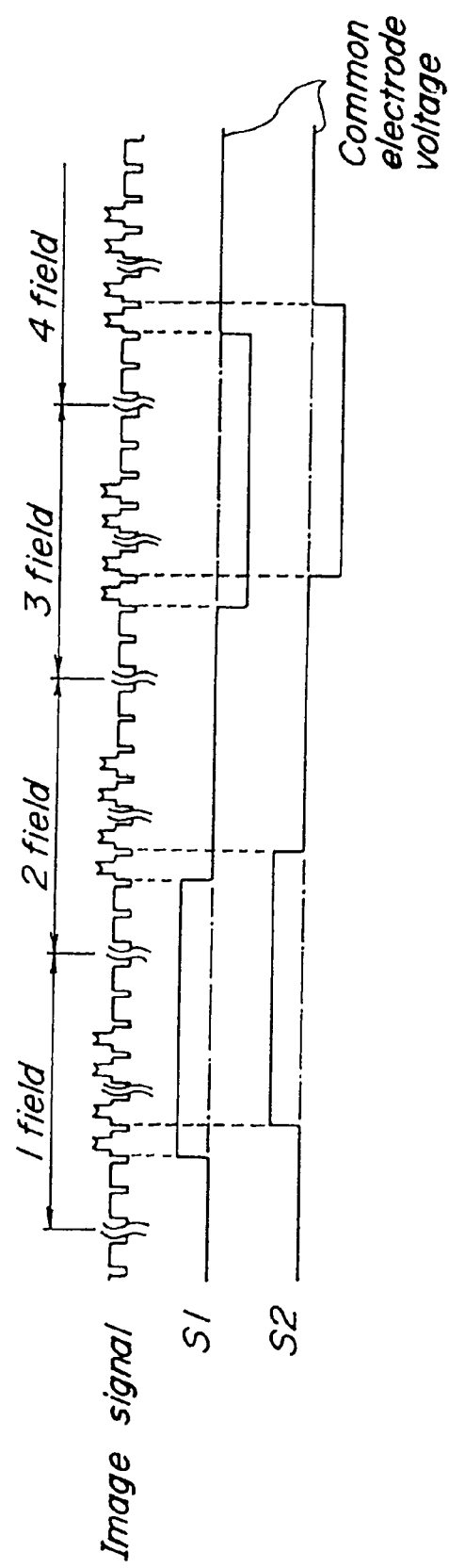
FIG. 6 is an explanatory view showing the pixel shifting operation shown in FIG. 4.

In the manner explained above, the sampled image signals of successive fields are supplied to the display LCD element 11 and are displayed thereon. At the same time, for each line, a voltage is applied from the line type liquid crystal drive circuit 25 to corresponding regions of the line type liquid crystal panel 16 in synchronism with the scanning. As shown in FIG. 6, the voltage is applied to successive line-wise electrodes 18 of the line type liquid crystal panel 16 during odd fields, so that pixels are shifted in a horizontal direction by a half of the pixel pitch. For instance, for a first line of the displayed image, during the first field, a voltage raising at a timing at which a first pixel of the first line image is driven is applied to a first line-wise region of the line type liquid crystal panel 16 via the first signal wire S1, so that the pixel shift is not performed at the first line. During a next even field, said voltage is decreased to a common electrode voltage level at a timing at which the first pixel of the first line is driven, sc, that the pixel shift is performed.

Figure 7:
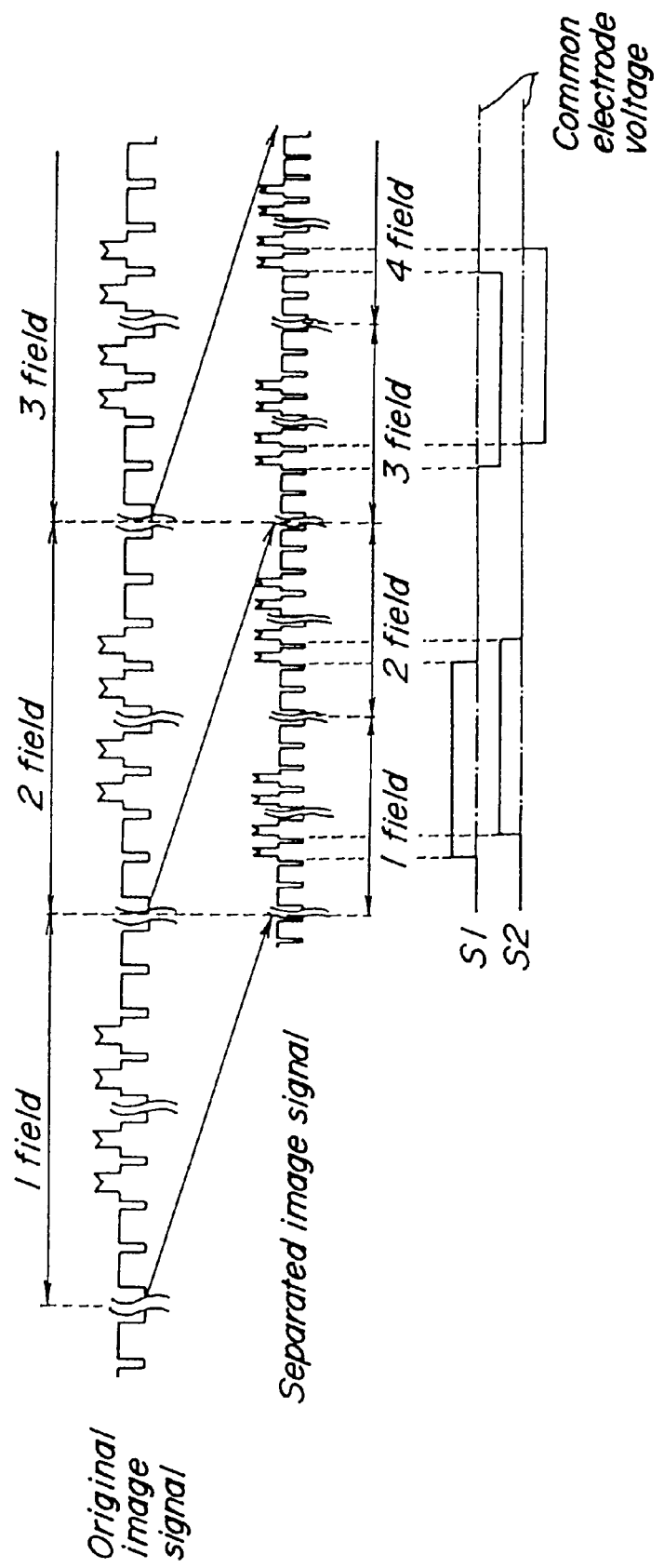
FIG. 7 is an explanatory view showing the pixel shifting operation shown in a second embodiment of the image display apparatus according to the present invention.

In the manner explained above, by performing the pixel shift in the direction of line, i.e. in the horizontal direction, during odd fields the image is displayed at positions denoted by black dots in FIG. 5 and during even fields the image is displayed at positions denoted by white circles, so that the horizontal resolution is increased. It should be noted that in order to mitigate degradation of the liquid crystal 20 of the line type liquid crystal panel 16, a polarity of the control voltage is inverted for every fields as illustrated in FIG. 7.

As explained above, in the present embodiment, only lines of the display LCD element 11 on which the image are to be changed is subjected to the pixel shift, and thus a previous image is no more displayed at positions which have been shifted. Therefore, the resolution can be increased effectively. In the present embodiment, as shown in FIG. 6, the voltage applied to a line electrode of the line type liquid crystal panel 16 lasts for one field period. However, the liquid crystal 20 of the line type liquid crystal panel 16 is made of a liquid crystal having a memory function such as ferrodielectric liquid crystal and anti-ferrodielectric liquid crystal, so that the voltage may be instantaneously applied to the line electrode by using, for instance a shift register. Then, the number of pins of the liquid crystal panel 16 may be reduced as compared with a case in which liquid crystal having no memory function is used.

In a second embodiment of the image display apparatus according to the invention, the original analog image signal is sampled such that the number of samples is equal to twice of the number of pixels of the display LCD element 11 to derive two field images which are displayed as image signals of $\frac{1}{120}$ seconds under the pixel shift. That is to say, the original image signal is divided into two image signals as shown in FIG. 8. The sampling signal may be produced by the synchronizing signal separated from the original NTSC composite signal. The thus sampled image signals are alternately stored in field memories 32 and 33 by means of a switching circuit 31 for successive fields of the original image signal as illustrated in FIG. 9. The thus stored image signals are alternately road out of the memories by means of a switching circuit 34.

In the present embodiment, the sampled image signal of an odd field of the original image signal is stored in the first field memory 32 and then the sampled image signal of a successive even field of the original image signal is stored in the second field memory 33, while at the same the sampled image signal stored in the first field memory 32 is read out at a field period of $\frac{1}{120}$ seconds. Therefore, during an even field of the original image signal, the sampled image signal of an odd field of the original image signal is read out as two field signals having the period of $\frac{1}{120}$ seconds. In this case, during the first field of $\frac{1}{120}$ seconds, odd numbered samples denoted by black dots in FIG. 8 are successively read out and during the second field of $\frac{1}{120}$ seconds, even numbered samples represented by white circles in FIG. 8 are successively read out. Then, the pixel shift is performed between the first field of $\frac{1}{120}$ seconds and the second field of $\frac{1}{120}$ seconds in a similar manner to that of the first embodiment.

In this manner, in the second embodiment, the original NTSC composite image signal is divided into two field signals and these image signals are read out at a field of $\frac{1}{120}$ seconds. Upon displaying these image signals, the pixel shift is carried out for successive lines like as the first embodiment. Therefore, a resolution for a moving object can be increased as compared with the first embodiment.

Figure 10B:
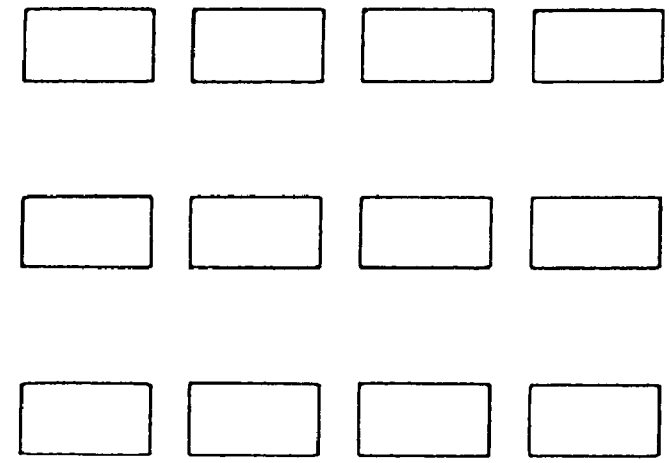
FIGS. 10A and 10B are explanatory views showing pixel arrays of usable display LCD in the present invention.
Figure 10A:
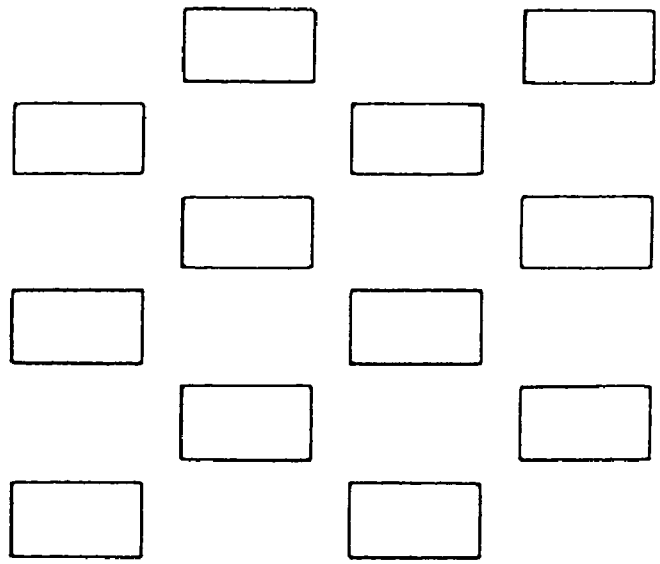
Figure 11B:
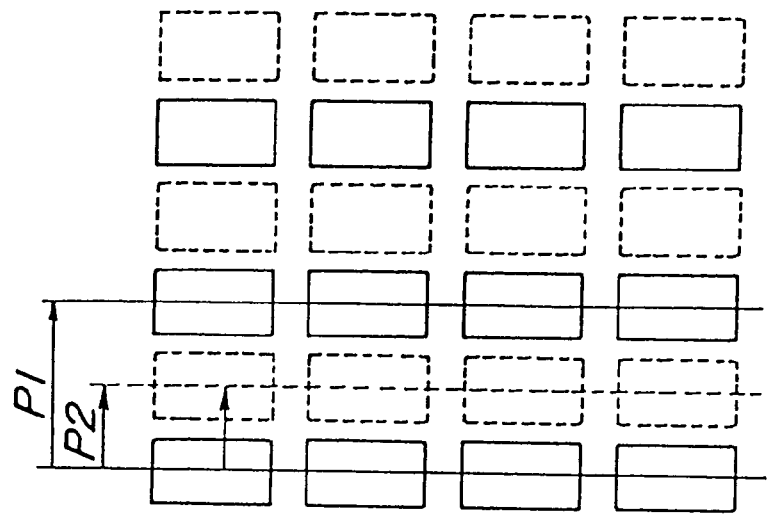
FIGS. 11A and 11B are explanatory views showing pixel conditions in the case that pixels of pixel array shown in FIG. 10.
Figure 11A:
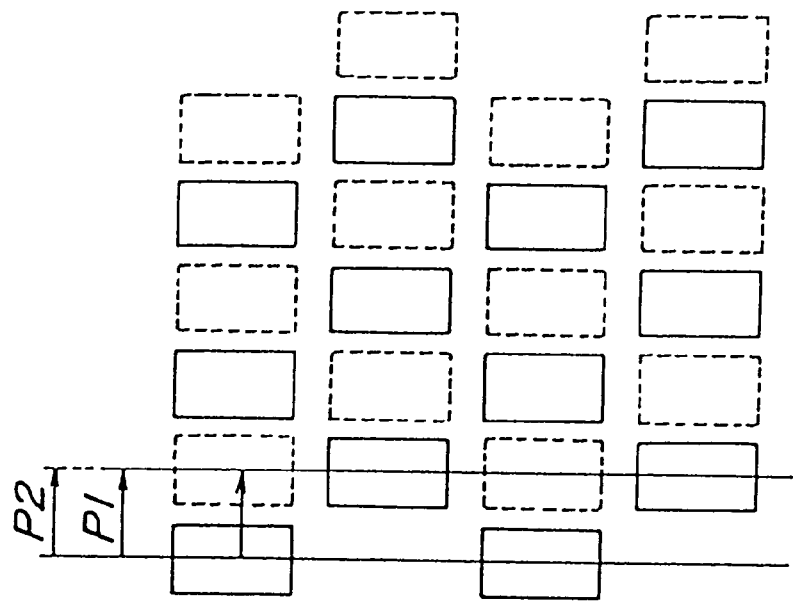

The pixel arrangement or array of the display LCD element 11 used in the above mentioned first and second embodiments may be formed to have a delta arrangement shown in FIG. 11A or a stripe arrangement illustrated in FIG. 10B. As to these pixel arrangements, when the pixel shift by ½ pitch is performed in the horizontal direction, in the delta arrangement a minimum pitch P1 in case of no pixel shift and a minimum pitch P2 in case of the pixel shift are identical with each other as depicted in FIG. 11A, but in the stripe arrangement, the pitch P2 becomes a half of the pitch P1 as shown in FIG. 11B. Therefore, in the above explained first and second embodiments, it is preferable to use the display LCD element of the stripe arrangement for improving the horizontal resolution.

In a third embodiment of the image display apparatus according to the invention, the direction of optical axis of the quartz plate 17 constructing the pixel shifting means shown in FIG. 2 in the first embodiment is changed to perform pixel shifting by ½ pitch in the vertical direction as shown in FIG. 12. That is, image signals of NTSC system have a scanning line number of one field being 262.5, so that the odd numbered row in first field, and even numbered row in second field are scanned respectively, thereby displaying an image of scanning line number being 525. However, small sized display LCD 11 has pixel number of substantially 250 in the vertical direction.

In this embodiment, image signals of successive fields of NTSC image signal are sampled respectively in accordance with the pixel number of the display LCD 11, thus scanned image signals of successive fields are supplied to the display LCD 11, thereby performing the displaying, and the line type liquid crystal 16 is controlled as in the first embodiment in synchronism with the scanning of respective lines, thereby performing pixel shifting in the vertical direction every field in line unit. In this case, the image signals of successive fields of NTSC system may be sampled with the same timing for odd number field and even number field.

In this way, in case of pixel-shifting thus sampled image signals of successive fields by ½ pitch in the vertical direction every fields with a line unit, vertical resolution can be increased without using field memory.

In a fourth embodiment of the image display apparatus according to the present invention, the direction of optical axis of the quartz plate 17 constructing the pixel shifting means shown in FIG. 2 in the first embodiment is changed to perform pixel shifting by ½ pitch lower and diagonally in the vertical direction and in the horizontal direction as shown in FIG. 13. To this end, in this embodiment, the image signals of successive fields of NTSC image signals are sampled respectively in accordance with pixel number of display LCD 11, the thus sampled image signals of successive fields are supplied to the display LCD 11, thereby performing the displaying, and the line type liquid crystal 16 is controlled as in the first embodiment in synchronism with the scanning of respective lines, thereby performing pixel shifting lower and diagonally every field with a line unit. In this case, the image signals of successive fields of NTSC system are sampled with a timing which is shifted by ½ pitch for odd numbered fields and even numbered fields.

In this way, in case of pixel-shifting thus sampled image signals of successive fields by ½ pitch in the vertical and horizontal directions every fields with a line unit, vertical and horizontal resolution can be increased without using field memory.

FIG. 14 shows a fifth embodiment of the image display apparatus according to the present invention. In this embodiment, two pixel shifting means 12 and 41 are provided to control them by the control means 14, thereby performing two steps of pixel shifting, and displaying images at three positions. In FIG. 14, the same parts as shown in FIG. 1 exhibit the same functions and shown by the same characters. The pixel shifting means 41 is constructed by a line type liquid crystal 42 and a quarts plate 43 as in the pixel shifting means 12.

Figure 15:
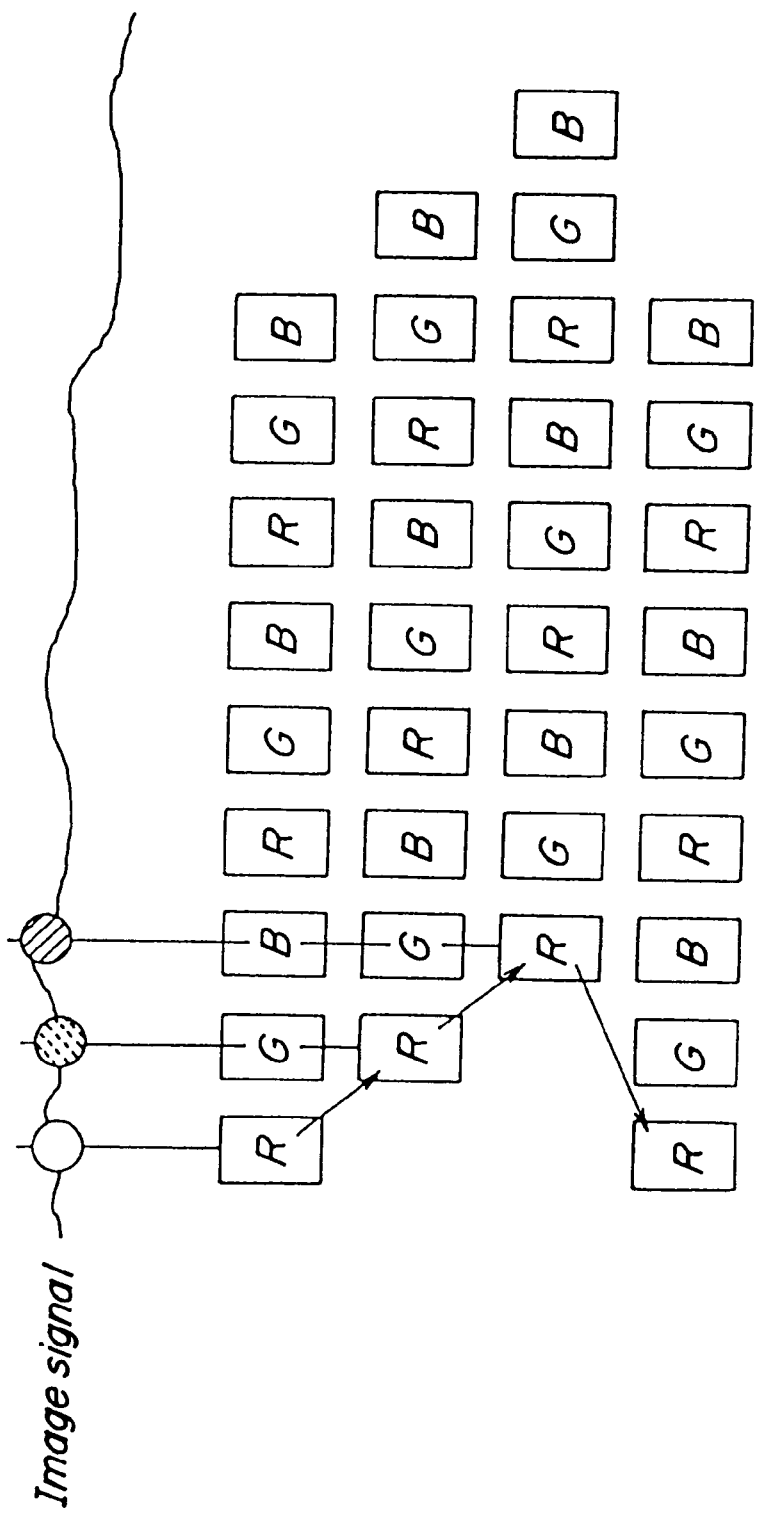
FIG. 15 is an explanatory view showing the operation of the fifth embodiment of the image display apparatus according to the present invention.

In this embodiment, for example, in the case of a color LCD having filters of R, G, B, successively, in the line direction, image signals of successive three fields are subjected to pixel shifting by one by one pixel in the line direction, thereby displaying them while shifting the position to be sampled. That is, as to respective lines, as shown in FIG. 15, in the first field, images are displayed on respective pixels of R, G, B, in the second field, respective pixels are shifted by one pixel, so that R is displayed on the pixel position of G, G is displayed on the pixel position of B, and B is displayed on the pixel position of R, and in the third field, respective pixels are shifted by more one pixel, so that R is displayed on the pixel position of B, G is displayed on the pixel position of R, and B is displayed on the pixel position of G.

In this way, the images of R, G, B components are displayed on respective pixels. In this case, generally, the pixel arrangement of R, G, B components are equal to each other, for example, as to the pixel of R, in the delta arrangement, as shown in FIG. 16A, the pixel pitch in the horizontal direction becomes P1 in the case of no pixel shifting, and becomes P2 in the case of pixel shifting, and in the stripe arrangement, as shown in FIG. 16B, the pixel pitch in the horizontal direction becomes P1 in the case of no pixel shifting, and becomes P2 in the case of pixel shifting, so that in any cases, the resolution can be increased by substantially three times.

In this embodiment, also, the image signals supplied to the display LCD 11 can be obtained by sampling the input image signals with the change of sampling position every field, as shown in FIG. 17A, or by dividing two fields of the input image signals into three fields of the image signals, and performing the sampling with the change of respective sampling positions, as shown in FIG. 17B, or by dividing one field of the image signal into three fields of the image signals, and performing the sampling with the change of respective sampling positions, as shown in FIG. 17C. In these three cases, the case shown in FIG. 17C can obtain highest resolution, but in this case, the display LCD 11 having high response speed is required, so that it is preferable to utilize the liquid crystal having high response speed, such as ferrodielectric liquid crystal or anti-ferrodielectric liquid crystal or the like.

In the above first to fifth embodiments, the line number of the display LCD 11 and the number of line regions of line type liquid crystals 16 and 42 which constituting pixel shifting means 12 and 41, are made correspondent to the ratio of one to one, but a plurality of line numbers of the display LCD 11 may be made correspondent to one line region of the line type liquid crystals 16, 42, thereby performing the pixel shifting in synchronism with the scanning of the plural lines. In this way, the more the number of line regions of the line type liquid crystals 16 and 42 is decreased, the more its construction become simple, and thus its drive circuit can be simplified. The line-wise liquid crystals 16, 42 can also be constructed so as to drive them as in the line-wise liquid crystal by utilizing common matrix type liquid crystal.

Figure 51:
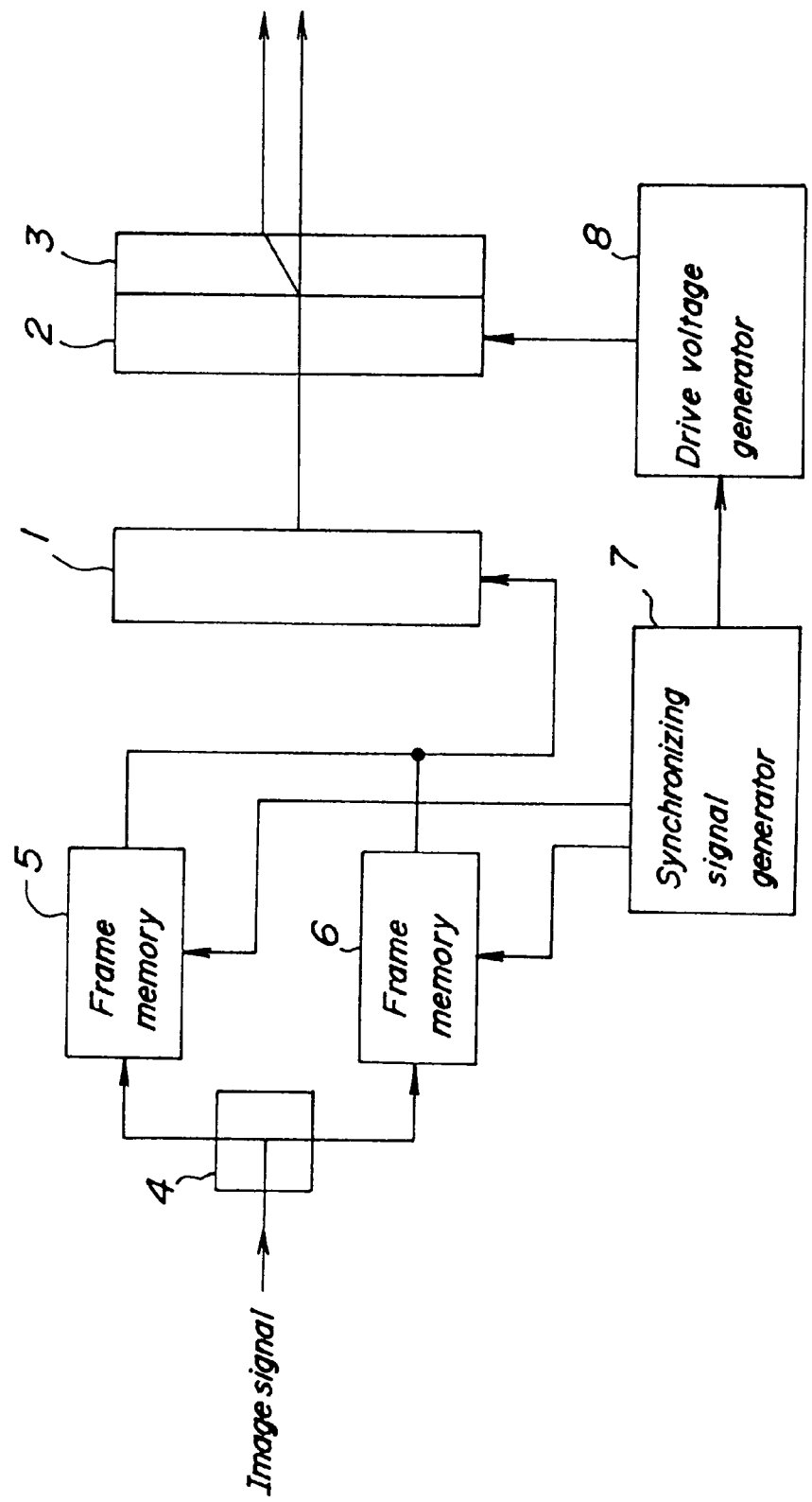
FIG. 51 is a plan view showing a conventional display apparatus.
Figure 52A:
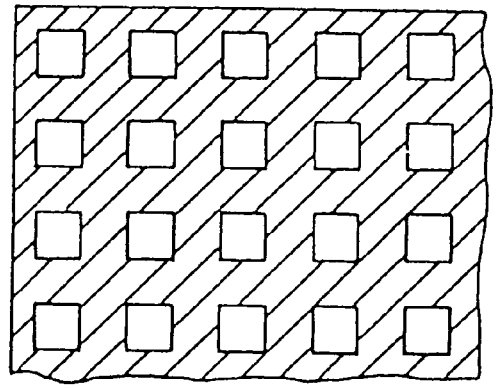
FIGS. 52A–C are an explanatory view showing the operation of the conventional display apparatus shown in FIG. 51.
Figure 52B:
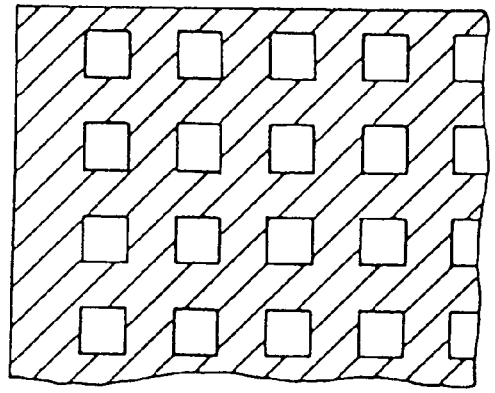
Figure 52C:
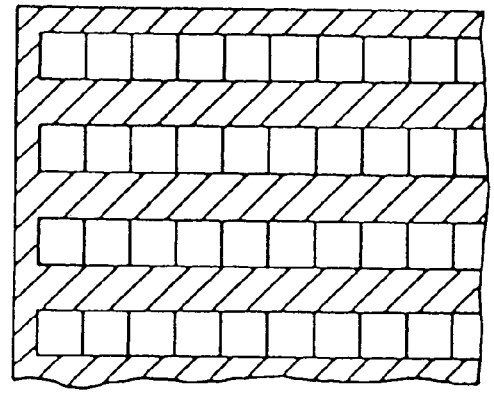

FIG. 18 shows a sixth embodiment of the image display apparatus according to the present invention. In this embodiment, the image signals are supplied to the display LCD 11 through a control circuit 51 to display them, these images are lead to the eyes 15 of the viewer through a pixel shifting means 52 and the observation (viewing) optical system 13 to observe a magnified virtual image, and then a sight line direction of the eyes 15 is detected by a sight line detecting means 53, thereby controlling the timing of pixel shifting by the pixel shifting means 52 based on the output of the sight line detecting means 53 through the control circuit 51. The pixel shifting means 52 is constructed by, for example, the polarizing direction controlling liquid crystal panel and the quartz plate as shown in FIG. 51.

Figure 20:
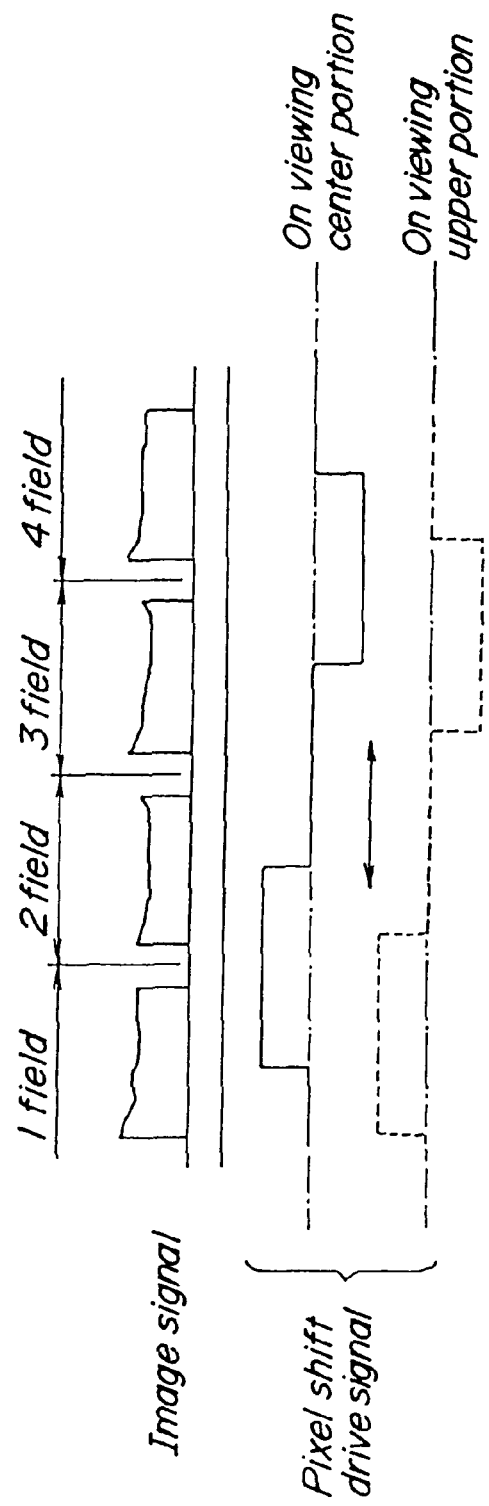
FIG. 20 is an explanatory view showing the timing of the pixel shifting shown in the sixth embodiment of the image display apparatus according to the present invention.

In this embodiment, that is, as shown in FIG. 19, for example, when the sight line is positioned at the center portion and the upper portion of the viewing image, the phase of drive signals of the pixel shifting means 52 is controlled in accordance with the above positions in such a manner that as shown in FIG. 20, the pixel position is changed at the center portion of the field in case of positioning the sight line at the center portion thereof, and the pixel position is changed at the beginning portion of the field in case of positioning the sight line at the upper portion thereof. For example, in case of displaying the images shown in FIG. 21, supporting that pixels of the display LCD 11 are positioned at rows of white circles, at first, as shown in FIG. 22A, pixels of the LCD 11 are fully white. Then, the rows of black circles are displayed, so that as shown in FIG. 22B, pixels of LCD 11 are rewritten to black. Therefore, as shown in FIG. 22C, the pixel shifting is performed at the time of positioning this rewriting at convergence row which is detected by the sight line detecting means 53, this rewriting is continued to last pixel as shown in FIG. 22D, while remaining such a condition.

Figure 23:
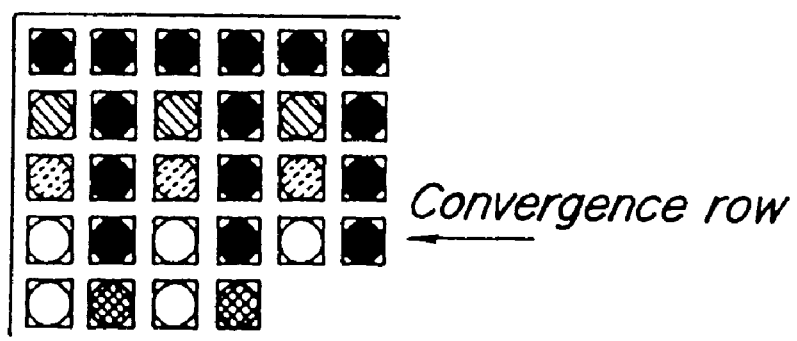
FIG. 23 is an explanatory view showing images observed by the pixel shifting in FIG. 22.

In this way, the pixel shifting is performed, the first line is rewritten to black from the time, during which the pixel lies at white position, so that the time positioned at black becomes long, the time positioned at white becomes long according as the line is near the convergence row, and at the last line, the time positioned at white becomes long, as long as the pixel is shifted to the black position. Therefore, as shown in FIG. 23, the viewing images become black at the upper portion, high resolution at the convergence row, and white at the lower portion. In this way, the resolution of the convergence row can be high in synchronism with the rewriting of the convergence row by performing the pixel shifting.

In this embodiment, also, one pixel shifting means 52 is utilized to perform one step of pixel shifting, but first and second pixel shifting means of the same construction may be utilized to perform two steps of pixel shifting. In this case, as shown in FIG. 24, the phase of drive signals a, b of the first and second pixel shifting means may be controlled in synchronism with the rewriting of convergence row, so as to perform the pixel shifting. The pixel shifting means 52 may also be constructed so as to directly shift the display LCD 11 by an actuator such as PZT or the like, or by using movement of lens, or through mirror, in addition to the utilization of the above described polarizing direction control liquid crystal panel and the quartz plate.

FIG. 25 shows a seventh embodiment of the image display apparatus according to the present invention. In this embodiment, as shown in FIG. 26, the display LCD 11 is provided with a back light 61. This light is switched off during the rewriting to pixel of respective field by the control means 62 based on the image signals as shown in Pig. 26, and is switched on until the beginning of rewriting to pixel of next field, that is, during vertical blanking, after completion of rewriting, so as to observe the images displayed on the display LCD 11. The pixel shifting means 52 is controlled to perform the pixel shifting every field by the control means 62.

According to such a construction, the images are not observed during the rewriting, 60 that the resolution can be increased.

FIG. 27 shows an eighth embodiment of the image display apparatus according to the present invention. In this embodiment, a liquid crystal shutter 63 is provided between the pixel shifting means 52 and the observing (viewing) optical system 13 instead of ON•OFF control of the back light 61. In this case, the back light 61 is made always ON state and the liquid crystal shutter 63 is controlled by the control means 62 in such a manner that the shutter 63 is made OFF state during the rewriting of pixels of respective fields as in the seventh embodiment to shield the transmitting light into the pixel shifting means 52, and is made ON state during vertical blanking period to transmit the light.

According to the eighth embodiment, therefore, the resolution of the viewing images can be increased as in the seventh embodiment, and the responsibility of the liquid crystal becomes superior to the ON•OFF control of the back light 61, since the liquid crystal 62 is subjected to On•OFF control, so that the images can be observed stably.

In a ninth embodiment of the image display apparatus according to the present invention, for the image signals displayed on the display LCD 1:L in the seventh and eighth embodiments, the time base of the image signal portion of original image signal is compressed by an image processing circuit using a memory as shown in FIG. 28 to prolong the vertical blanking period. In this way, observing time of the image can be made long, so that brighter image can be viewed.

In the seventh to ninth embodiments, also, the pixel shifting means 52 may be constructed any the polarizing direction control liquid crystal panel and the quartz plate, or it may also be constructed in such a manner that the display LCD 11 is directly shifted by an actuator such as PZT or the like, or shifted by using movement of lens, or through mirror.

FIG. 29 shows a tenth embodiment of the image display apparatus according to the present invention.

In this embodiment, the display element utilizes a liquid crystal panel (LCD) 71 which is constructed by delta-arranging respective pixels, for example, R, G, B pixels in a matrix shape, on which images having different sampling timing by a pixel pitch are displayed successively. These LCDs 71 are switched in such a manner that the optical axes of respective pixels are shifted by a pixel pitch in the direction opposite to the shifting direction of the images due to a sampling timing by the optical axis shifting means in synchronism with the display of the images, thereby obtaining a high resolution. To this end, in this embodiment, a back light 72 generating a white light is arranged at the back side of the LCD 71 and a first polarization converting liquid crystal plate 73, a first birefringent plate 74, a second polarization converting liquid crystal plate 75 and a second birefringent plate 76 which constitute an optical axis shifting means, are arranged in order at front side of the LCD 71.

The LCD 71 is scanned in the horizontal direction so as to display the images on the image plane vertically, and is controlled in such a manner that the images are displayed by shifting the sampling timing of the image signals by a pixel pitch with a LCD drive circuit (not shown). The first and second polarization converting liquid crystal plates 73 and 75 are subjected to On•OFF control in synchronism with the display of images by LCD 71 by a liquid crystal control circuit (not shown), so as to transmit incident polarized light, as it is, under the ON state and to rotate the incident polarized light by 90 degrees under the OFF state.

The light transmitted through the first polarization converting liquid crystal plates 73 is transmitted through the first birefringent plate 74 in accordance with the polarizing state, as it is, or by shifting the optical axis by one pixel pitch (x) in the direction opposite to the shifting direction of the image due to the shift of the sampling timing, and the light transmitted through the second polarization converting liquid crystal plates 75 is transmitted through the second birefringent plate 76 in accordance with the polarizing state, as it is, or by shifting the optical axis by one pixel pitch (x) in the direction opposite to the shifting direction of the image due to the shift of the sampling timing.

The first and second birefringent plates 74, 76 may be constructed by quartz ($\alpha$-$SiO_2$), rutile ($TiO_2$), calcite ($CaCO_3$), Chile saltpeter ($NaNO_3$) and $YVO_4$, particularly, it is preferred to use rutile. That is, rutile has a birefringence which is larger than that of quartz by 30 times, so that its thickness can be made thinner by 1/30 times. If the optical axis is shifted by 50 $\mu$m, for example, its thickness may be made 0.5 mm. Rutile has large Mohs hardness as compared with other materials, so that working becomes easy.

The first and second birefringent plates 74, 76 are generally referred to as Savart plate and have a crystal axis which is slanted by 45 degrees to its surface, so that if incident polarized light is an ordinary ray, this light is transmitted through the birefringent plate straightly and emanated therefrom, but if the incident polarized light is an extraordinary ray, the light is shifted by and emanated from the birefringent plate, and its shifted amount may be adjusted by the thickness of Savart plate. In this embodiment, the thickness of the first and second birefringent plates 74, 76 is set in such a manner that the shifted amount is equal to the pixel pitch of the respective LCD 71. In this way, in case of utilizing Savart plate, two optical axes of the light emanated from the Savart plate according to incident polarizing light become parallel, so that shift amount of two optical axes is constant, irrespective of the distance to LCD 71, and thus, the freedom to the arrangement of respective birefringent plates can be obtained for LCD 71.

The operation of the tenth embodiment is explained with reference to FIG. 30.

At first, for example, the voltage supplied to the first polarization converting liquid crystal plate 73 is made OFF state, and the voltage supplied to second polarization converting liquid crystal plate 75 is made ON state, the image signals of sampling timing m are supplied to respective pixels of R, G, B of LCD 71. In this case, the images displayed on the LCD 71 are rotated by 90 degrees by the first polarization converting liquid crystal plate 73 in its polarizing direction, so that the images are transmitted through the first and second birefringent plates 74, 76, as it is.

Then, the voltage supplied to the first polarization converting liquid crystal plate 73 is made ON state, and the voltage supplied to the second polarization converting liquid crystal plate 75 is made OFF state, the image signals of sampling timing m+x, which is shifted by one pixel pitch (x) to time sampling timing m, are supplied to respective pixels of R, G, B of LCD 71. In this case, the images on the LCD 71 are shifted by one pixel pitch from the case of images for prior sampling timing m, but these images are transmitted through the first polarization converting liquid crystal plate 73 as it is, so that the images are transmitted by shifting the optical axis by one pixel pitch (x) in the direction opposite to the shifting direction of the image due to the shift of the sampling timing by the first birefringent plates 74, and then, are transmitted through the second birefringent plate 76, as it is, by rotating the polarizing direction by 90 degrees by the second polarization converting liquid crystal plate 75.

Then, the voltages supplied to the first and second polarization converting liquid crystal plates 73 and 75 are made ON state, respectively, the image signals having sampling timing m+2x which is shifted by two pixel pitches (2x), for the sampling timing m, are supplied to respective pixels of R, G, B of the LCD 71. In this case, the images on the LCD 71 are shifted by two pixel pitches from the case of images for prior sampling timing m, but these images are transmitted through the first polarization converting liquid crystal plate 73 as it is, so that the images are transmitted by shifting the optical axis by one pixel pitch (x) in the direction opposite to the shifting direction of the image due to the shift of the sampling timing by the first birefringent plates 74, and then, are transmitted through the second polarization converting liquid crystal plate 75, as it is. Therefore, the optical axis is shifted by one pixel pitch (x) in the direction opposite to the shifting direction of the image due to the sampling timing by the second birefringent plates 76. That is, the displayed images on the LCD 71 are transmitted by shifting the optical axis of respective pixels by two pixel pitches (2x) in the direction opposite to the shifting direction of the image due to the sampling timing.

In this way, as to the observing (viewing) images, as shown in FIGS. 31A, 31B and 31C by a part of viewing pixel arrangement, the images having different R, G, B with time can be observed on the same pixel position, that is, respective colors of R, G, B can be observed on one pixel, so that the resolution of the image can be increased by three times.

The switching period of successive image signals, that is, the switching period of thus picture can be made 1/30 sec (corresponding to one frame), or 1/60 sec (corresponding to one field), and can be made 1/90 sec, 1/120 sec or 1/180 sec by scanning with double speed. As the switching period is made fast, the LCD 71 having fast response time, such as response time of less than 8 ms, 4 ms, 2.7 ms, 2 ms and 1.3 ms must be required.

The system of obtaining high resolution in this embodiment, can effectively be applied to particularly a head-mounted image display apparatus (hereinafter, referred to as HMD) shown in FIG. 32. The HMD shown in FIG. 32 comprises a display apparatus unit 81, a side head frame 82 and a top head frame 83, the side head frame 82 and the top head frame 83 are mounted on a head of a viewer (user) 84, so as to support or hold the display apparatus unit 81 on the face of the viewer 84. The side head frame 82 is mounted with a rear frame 86 by a leaf spring 85, and the rear frame 86 is provided with a loud speaker 87 at an ear of the viewer 84.

The display apparatus unit 81 is connected to a reproducing device 89 through a cable 88, and required image signals are supplied to the display apparatus unit 81 from the reproducing device 89, to supply the corresponding voice signals to the speaker 87. The reproducing device is provided with a adjusting means 90 such as a volume or the like, thereby adjusting the level of the voice signals or the like.

The display apparatus unit 81 is also provided with an optical system as shown in FIGS. 33A or 33B in corresponding to respective eyes of the viewer 84. The optical system shown in FIGS. 33A is of see-through type, and constructed in such a manner that the display images on a LCD 91 are transmitted through a half-mirror prism 92, reflected on a concave mirror 93, again reflected on the half-mirror prism 92, and lead to corresponding eye with magnification. An external sighting image is also lead to corresponding eye through for example a liquid crystal shutter 94 and the half-mirror 92. In the optical system shown in FIG. 33B the image signals on an LCD 95 are lead to the corresponding eye through an ocular 96.

Figure 32:
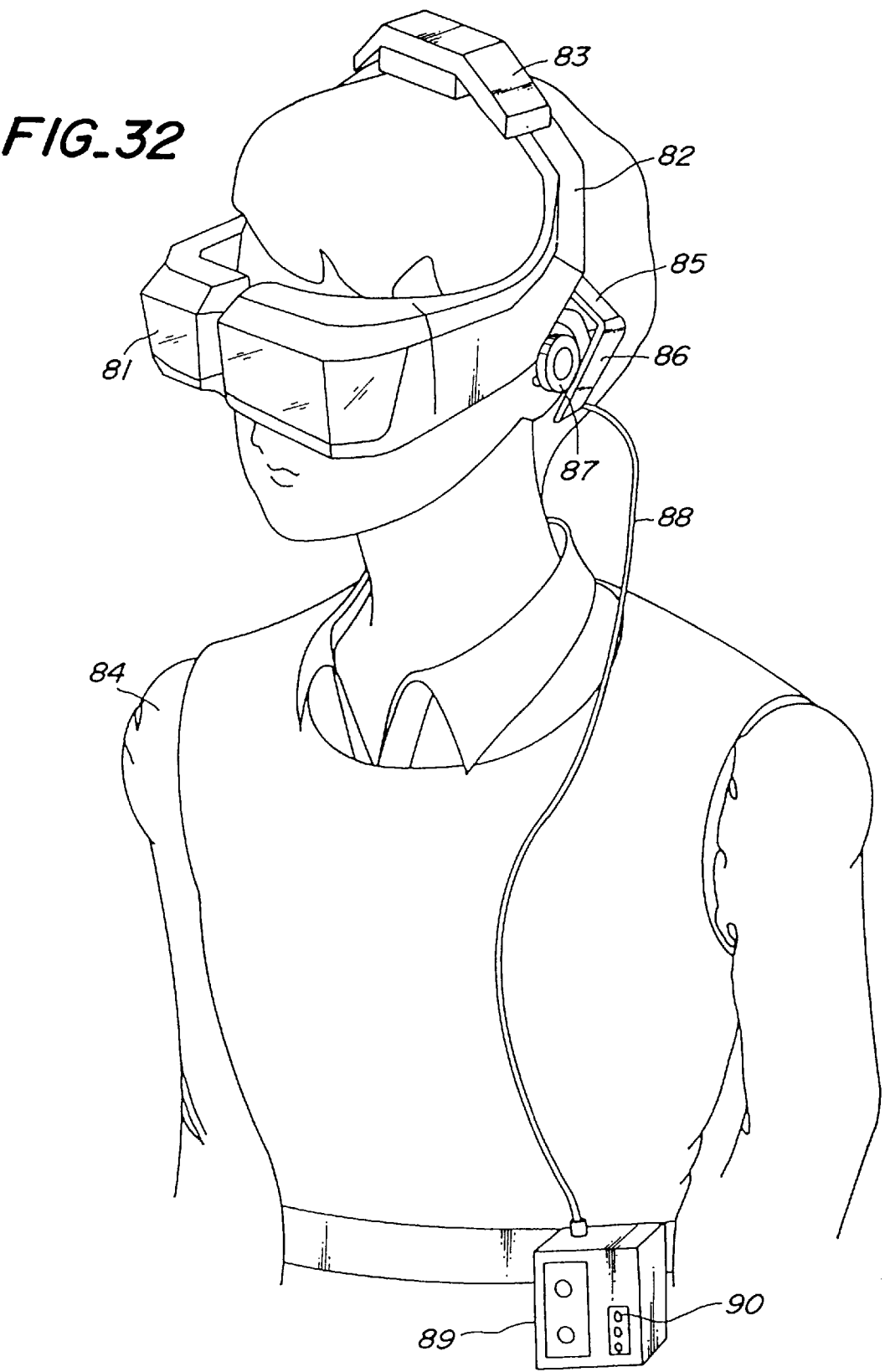
FIG. 32 is a perspective view showing the construction of one example of a head-mounted image display apparatus capable of applying the tenth embodiment of the present invention.

In the HMD shown in FIG. 32 the image signals having for example parallax are supplied to and displayed on the optical system corresponding to right and left eyes, thereby observing a stereoscopic image. In FIG. 32, the display apparatus unit 81 is connected to a conventional video deck and a TV tuner through the cable 88 to display the image or to a computer to display the image of a computer graphics and a message image from the computer. Alternatively, the display apparatus unit 81 is provided with an antenna without using the cable 88, to receive the image signals externally as an electromagnetic wave.

In the above described HMD, LCD constituting an optical system is small, for example 1.3 inches. Such a small LCD has at most 300 thousand pixels as a commercially obtained LCD. However, as a wide angle HMD, it is required to obtain HMD having further more pixel number.

If the above described high resolution system is applied to such a HMD, therefore, the pixel number of LCD can effectively be made three times.

Figure 34:
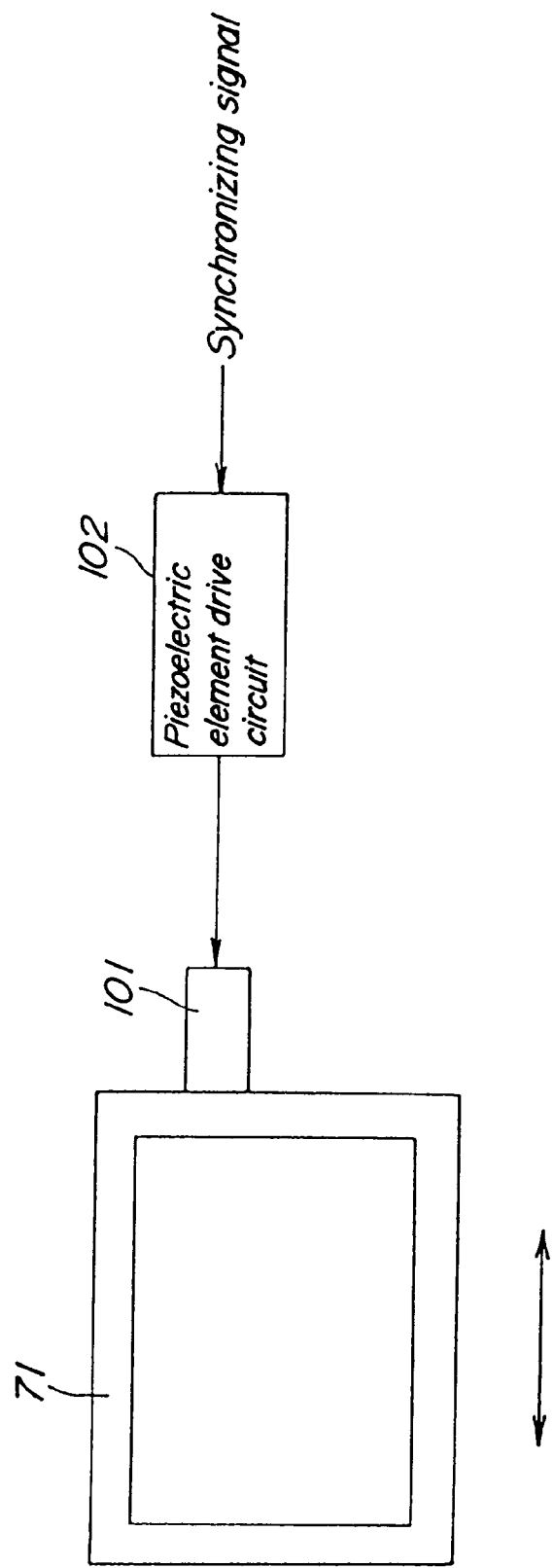
FIG. 34 is a plan view showing a eleventh embodiment of a display apparatus according to the present invention.

FIG. 34 shows an eleventh embodiment of the image display apparatus according to the present invention. In this embodiment, a piezo-electric element 101 is utilized as an optical axis shifting means, thereby direct-shifting the LCD 71 constructed as in the tenth embodiment, resulting in a high resolution. The piezo-electric element 101 is adhered to the LCD 71 and driven by a piezo-electric element driver circuit 102 based on the synchronizing signal separated from the image signals.

In this embodiment, at first, image signals having sampling timing m are supplied to respective pixels of R, G, B of the LCD 71 under the state in which LCD 71 is not shifted, as in the tenth embodiment. Then, the image signals having timing m+x which is shifted by one pixel pitch (x) for the sampling timing m are supplied to respective pixels of R, G, B of LCD 71. In this case, LCD 71 is shifted by one pixel pitch (x) in the direction opposite to the shifting direction of the image due to the sampling timing by the piezoelectric element 101 through the piezo-electric element driver circuit 102 based on the synchronizing signals. Then, the image signals having timing m+2x which is shifted by two pixel pitches (2x) for the sampling timing m are supplied to respective pixels cf R, G, B of LCD 71. In this case, LCD 71 is shifted by two pixel pitches (2x) in the direction opposite to the shifting direction of the image due to the sampling timing by the piezo-electric element 101 based on the synchronizing signals.

In this way, as in the tenth embodiment, the images having different R, G, B with time can be observed on the same pixel position, so that the resolution of the image can be increased by three times.

Figure 35:
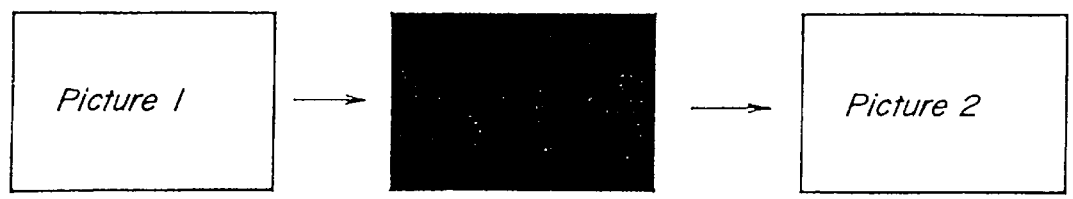
FIG. 35 is an explanatory view showing a twelfth embodiment of the display apparatus according to the present invention.

In a twelfth embodiment of the image display apparatus according to the present invention, in order to perform the pixel shifting by selectively shifting the optical axis of images on the display element by the optical axis shifting means in the tenth and eleventh embodiments, any images are not displayed on the display element at an instant of performing pixel shifting. That is, black is displayed. For example, as shown in FIG. 35, if the images having different sampling timing of a picture 1 and a picture 2 to each other are continuously displayed, a black picture is inserted between the picture 1 and the picture 2.

Figure 36:
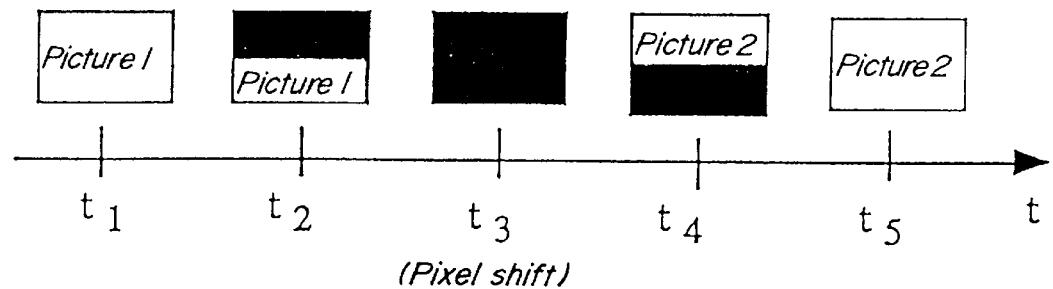
FIG. 36 is an explanatory view showing the twelfth embodiment of the display apparatus according to the present invention.

FIG. 36 shows the change of the images on the display element in this embodiment. As shown in FIG. 36, at an instant (time) t1, a picture 1 is displayed on the display element, at a time t2, the picture 1 is gradually rewritten by a black image from upper side and at a time t3, the picture 1 is wholly replaced by a black image. At this instant, the pixel shifting is performed, at a time t4, the black image is gradually rewritten by a picture 2 from upper side, and at a time t5, whole image of picture 2 is displayed. If such an operation is performed, the instant in which the picture 1 and the picture 2 are displayed simultaneously, is not present, the pixel shifting can be performed by wholly separating the pictures 1 and the picture 2, so that the resolution can be increased.

In the twelfth embodiment, the black image is displayed at the instant in which the pixel shifting is performed, a flicker due to black display becomes a problem. In a thirteenth embodiment, in order to prevent such a flicker due to the black display, the image to be pixel-shifted and the image to be not pixel-shifted are not alternatively displayed. That is, in this embodiment, the pixel shifting is controlled in the following order; shifted image—non shifted image—non shifted image—sifted image—shifted image. Particularly, in the control of pixel shifting, the black image is displayed at the change of shifting condition. If such a control is performed, the period in which the black image is displayed becomes two times, so that the flicker can be decreased.

Figure 37:
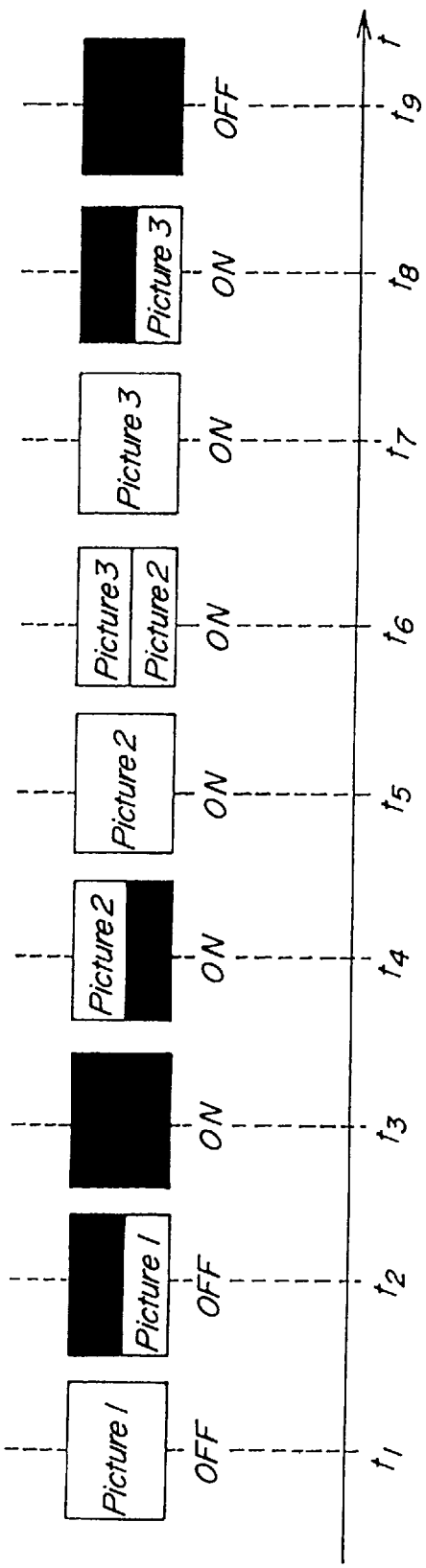
FIG. 37 is an explanatory view showing a thirteenth embodiment of the display apparatus according to the present invention.

FIG. 37 shows the change of image on the display element in this embodiment. As shown in FIG. 37, the picture 1 shows the image to be not shifted and the pictures 2 and 3 show the image to be shifted. In this embodiment, the pixel shifting is not performed during display of the picture 1 (OFF), and the shifting control is performed (ON) at whole black display between the picture 1 and the picture 2 (time t3), and then, the picture 2 and the picture 3 are consecutively displayed by the shifting control, and the control to be not shifted (OFF) is again performed.

FIG. 38 is an explanatory view showing a fourteenth embodiment of the image display apparatus according to the present invention. In this embodiment, when the thirteenth embodiment is applied to HMD shown in FIG. 32, the flicker due to the display of the black image is effectively suppressed. To this end, in this embodiment, the timing for displaying the image is shifted by $\Delta t$ corresponding to ¼ of picture displaying period. The black image displaying is also shifted by $3\Delta t$. If such an operation is performed, in right and left optical system, whole black image is not displayed simultaneously, so that the flicker due to black image displaying can effectively be suppressed.

FIG. 39 is a block diagram showing one example of the circuit structure in the fourteenth embodiment. This embodiment shows the case that right and left optical systems of HMD have an optical axis shifting means shown in FIG. 29, respectively. In this circuit structure, the image signals from an image reproducer (not shown) are separated into a synchronizing signal and an image signal by a synchronous separator circuit 111, and the separated image signals are separated into right and left image signals in a right and left separator circuit 112. The left image signals separated from the right and left separator circuit 112 are stored in a frame memory 113L and the right image signals are stored in a memory 113R by delaying them by $\Delta t$ by a $\Delta t$ delay circuit 120. The left image signals stored in the frame memory 113L are supplied to an LCD of a left optical system (not shown) through a switch circuit 114L and a left LCD drive circuit 115L, and the right image signals stored in the frame memory 113R are supplied to an LCD of a right optical system (not shown) through a switch circuit 114R and a left LCD drive circuit 115R.

While the synchronizing signals separated by the synchronous separator circuit 111 are supplied to a switch control circuit 116 to generate control signals synchronized to $6\Delta t$ based on the inputted synchronous signals. These control signals are supplied to a switch circuit 114L, a sampling control circuit 117L and a left liquid crystal control circuit 118L, and supplied to a switch circuit 114R, a sampling control circuit 117R and a right liquid crystal control circuit 118R after delaying them by $3\Delta t$ by a $3\Delta t$ delay circuit 119.

In this way, the switch circuit 114L is made OFF state every $6\Delta t$ in synchronism with the control signals from a control circuit 116 to display the black image on the LCD of left optical system, to control the sampling timing of left image signals in the left LCD drive circuit 115L due to the sampling control circuit 117L and to control the application of voltage to the first and second polarization converting liquid crystal plates 73 and 75 (refer to FIG. 29) of the left optical system due to the left liquid crystal control circuit 118L in accordance with the sampling timing. Similarly, the switch circuit 114R is made OFF state every $6\Delta t$ in synchronism with the control signals from the control circuit 116 to display the black image on the LCD of right optical system, to control the sampling timing of right image signals in the right LCD drive circuit 115R due to the sampling control circuit 117R and to control the application of voltage to the first and second polarization converting liquid crystal plates 73 and 75 (refer to FIG. 29) of the right optical system due to the right liquid crystal control circuit 118R.

In this case, right and left LCDs display the black image every $6\Delta t$, the control for switching circuits 114L, 114R due to the switch control circuit 116 has a difference $3\Delta t$ by $3\Delta t$ delay circuit 119, so that the black image display due to right and left LCDs are alternately performed every $3\Delta t$.

FIG. 40 shows a fifteenth embodiment of the image display apparatus according to the present invention. This embodiment utilizes a scanning type illumination light source 122 as a back light in the construction shown in FIG. 29, and this illumination light source 122 is driven for scanning in such a manner that the line to be scanned and displayed of LCD 71 is illuminated based on the synchronous signals to LCD 71 by a scanning type illumination light source drive circuit (not shown). The other construction and operation are the same as those of the tenth embodiment, so that its detailed explanation is omitted. The illumination light source 122 may utilize for example CRT, electroluminesence display, plasma display or the like.

In this way, if the displayed line is illuminated in synchronism with the scanning and displaying for LCD 71, different pictures are not displayed simultaneously, so that the resolution can be increased.

FIG. 41 shows a sixteenth embodiment of the image display apparatus according to the present invention. In this embodiment, as shown in FIG. 40, the scanning illumination light source 122 comprises a point light source 123, a cylindrical lens 124 and a polygon mirror 125. The polygon mirror 125 is rotated in synchronism with the scanning and displaying for LCD 71, and the light flux emanated from the point light source 123, and converted into line shape by the cylindrical lens 124, is reflected on the polygon mirror 125, to illuminate the line being scanned and displayed to LCD 71.

In FIGS. 40 and 41, it is not necessary to coincide the illumination width of LCD 71 by the scanning illumination light source 122 to line width of LCD 71. For example, if the illumination width is less than the line width of the LCD 71 by 50 times, sufficient effect can be obtained. Particularly, in the case of FIG. 40, if the scanning and illumination width of the scanning illumination light source 122 is made substantially less than two times to more than 50 times of the line width of LCD 71, the scanning and illumination system can be made inexpensive, while remaining the effect of resolution improvement.

In the above embodiments, the pixel shifting is performed with the use of the display elements having strong residual imaging such as LCD, the resolution of scanning line becomes highest at the instant in which pixel shifting is performed, and becomes decreased according to the departure from this line vertically. Then, in a seventeenth embodiment of the image display apparatus according to the present invention, the average resolution on the whole display planes is increased by changing the timing of pixel shifting.

FIGS. 42A, 42B and 43C show the chance of images on the LCD in the seventeenth embodiment and the timing of pixel shifting. FIG. 42A shows the case in which the pixel shifting is performed in case of rewriting the line of substantially 1/6 of LCD display plane by a new picture 2, so that the resolution becomes highest at upper side of line. FIG. 42B shows the case in which the pixel shifting is performed in case of rewriting the line of substantially 1/2 of LCD display plane by a new picture 6, so that the resolution becomes highest at center line. FIG. 42C shows the case in which the pixel shifting is performed in case of rewriting the line of substantially 5/6 of LCD display plane by a new picture 10, so that the resolution becomes highest at lower lines. In this embodiment, the resolution over the image plane can be increased by the time average, by repeating the timings shown in FIGS. 42A, 42B and 42C, periodically.

Figure 43:
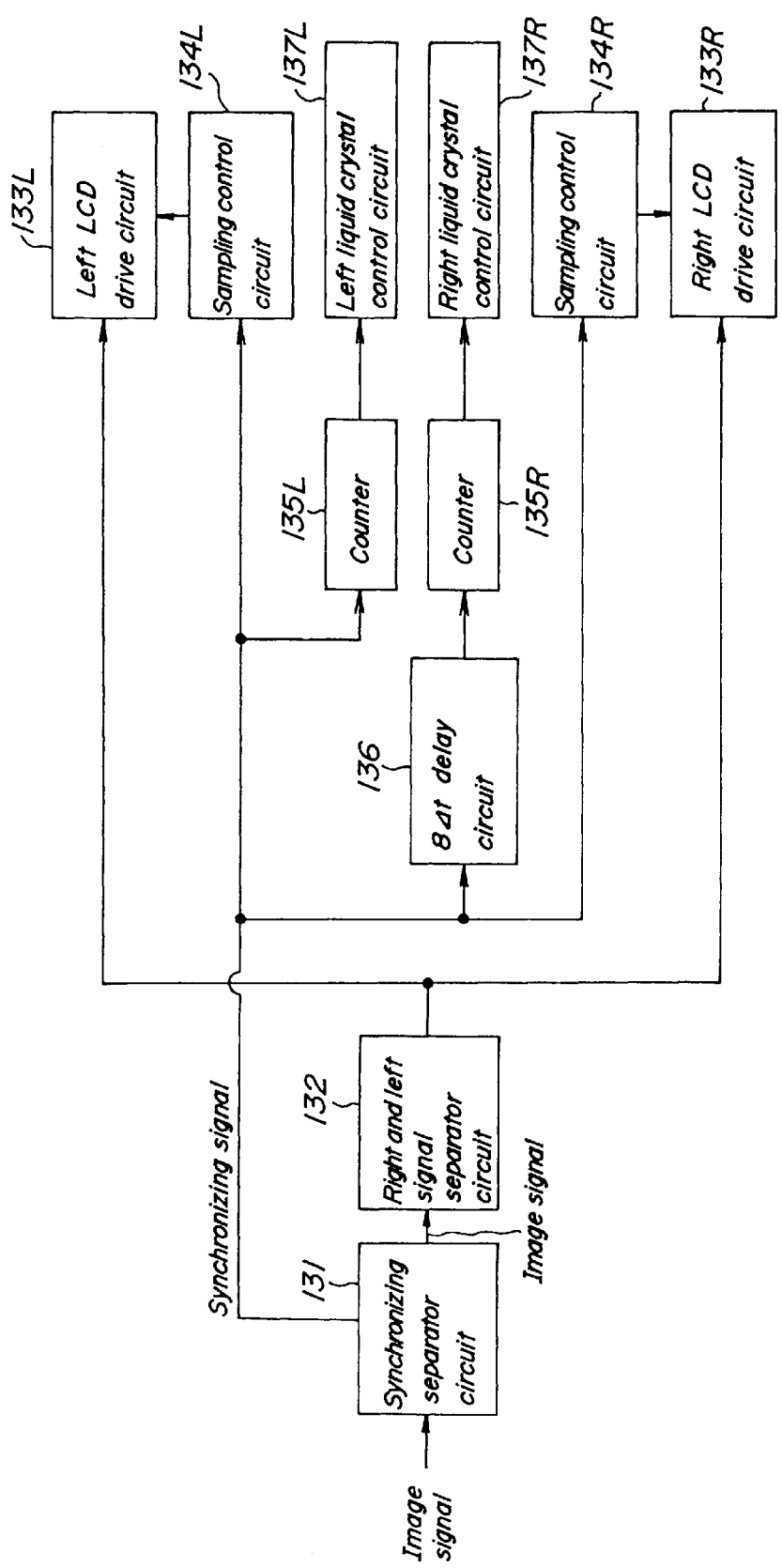
FIG. 43 is a block diagram showing one example of a circuit construction shown in the seventeenth embodiment of the present invention.

FIG. 43 shows the construction of one example of the circuit performing the operations shown in FIGS. 42A, 42B and 42C. This circuit is applied to HMD shown in FIG. 32, and this shows the case in which the right and left optical systems of HMD have the optical axis shifting means having the construction shown in FIG. 29, respectively. In this embodiment, the image signals from an image reproducer (not shown) are separated into a synchronizing signal and an image signal by a synchronous separator circuit 131, and the separated image signals are separated into right and left image signals in a right and left separator circuit 132. The left image signals separated from the right and left separator circuit 132 are supplied to an LCD of a left optical system (not shown) through a left LCD drive circuit 133L, and similarly the right image signals are supplied to an LCD of a right optical system (not shown) through a right LCD drive circuit 133R.

While the synchronous signals separated by the synchronous separator circuit 131 are supplied to a sampling control circuit 134L and a sampling control circuit 143R and then supplied to a counter 135L and further supplied to a counter 135R through 8Δt delay circuit 136. The output of the counter 135L is supplied to a left liquid crystal control circuit 137L for controlling the application of voltage to the first and second polarization converting liquid crystal plates 73, 75 (refer to FIG. 29) of the left optical system, and similarly, the output of the counter 135R is supplied to a right liquid crystal control circuit 137R for controlling the application of voltage to the first and second polarization converting liquid crystal plates of the right optical system.

In this way, in the left optical system, the sampling timing of left image signal in the left LCD drive circuit 133L by the sampling control circuit 134L based on the synchronous signals, is controlled to display the pixel shifted images, and the synchronous signals are counted by the counter 135L, thereby controlling the application of voltage to the first and second polarization converting liquid crystal plates by the left liquid crystal control circuit 137L based on the counted value, resulting in a control of switching timing of the polarization direction of images from the LCD as explained in FIG. 42.

Similarly, in the right optical system, also, the sampling timing of right image signal in the right LCD drive circuit 133R by the sampling control circuit 134R based on the synchronous signals, is controlled to display the pixel shifted images, and the synchronous signals are counted by the counter 135R, thereby controlling the application of voltage to the first and second polarization converting liquid crystal plates by the right liquid crystal control circuit 137R based on the counted value, resulting in a control of switching timing of the polarization direction of images from the LCD as explained in FIG. 42A–42C.

In this way, even in case of using LCD having strong residual imaging, by changing the timing of the pixel shifting, the average resolution on the whole display plane can be increased. In FIG. 43, also, there is a difference of 8Δt in the synchronous signals supplied to the counters 135L and 135R by the 8Δt delay circuit 136, so that the switching timing of the polarizing direction for the right and left optical system becomes different, and thus, the flicker due to change of resolution caused by changing the timing can be effectively suppressed.

In the circuit construction shown in FIG. 43, also, the optical axis shifting means utilizes the construction shown in FIG. 29. In this embodiment. In this embodiment, the first and second polarization converting liquid crystal plates 73 and 75 forming the optical axis shifting means shown in FIG. 29 are constructed to pixel-shift whole image plane, simultaneously, by one electrode plate.

In the seventeenth embodiment, however, in case of changing the timing of the pixel shifting, the polarization converting liquid crystal plate having electrodes of line type is utilized, respective lines are controlled in accordance with scanning timing of LCD. Such a construction is shown in FIG. 44 as an eighteenth embodiment.

Figure 44:
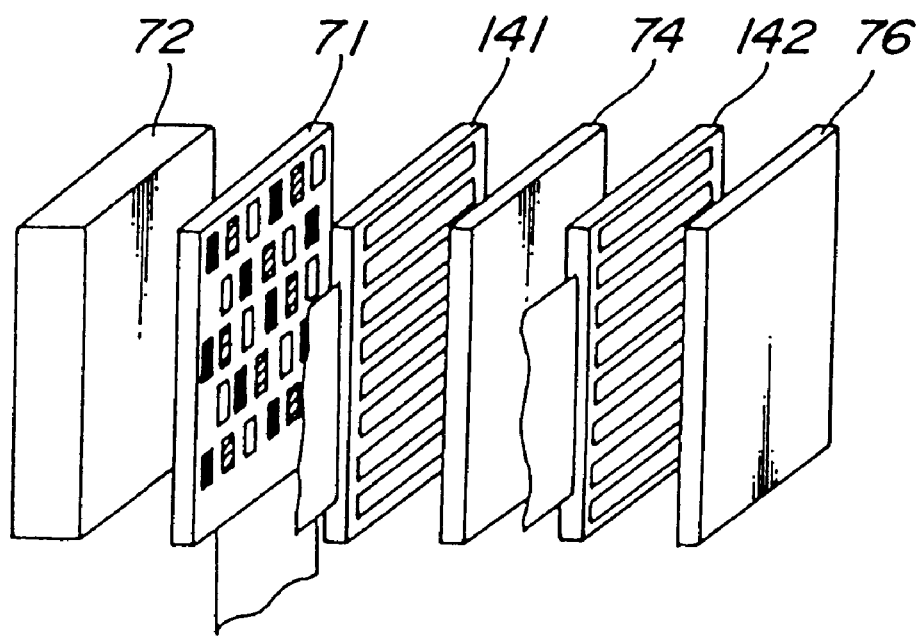
FIG. 44 is a perspective view showing an eighteenth embodiment of a display apparatus according to the present invention.

The display apparatus shown in FIG. 44 comprises a line type of first and second polarization converting liquid crystal plates 141, 142, instead of whole plane type of first and second polarization converting liquid crystal plates 73 and 75, so as to perform the pixel shifting by controlling these liquid crystal plates every line with the corresponding liquid crystal control circuit (not shown), respectively. The other construction of the apparatus is the same as that of the first embodiment. The line number of the first and second polarization converting liquid crystal plates 141, 142 is not always equal to the line number of LCD 71. If this number is at least 1/3 of the line number of LCD 71, the average resolution on whole display plane can be increased.

Figure 45:
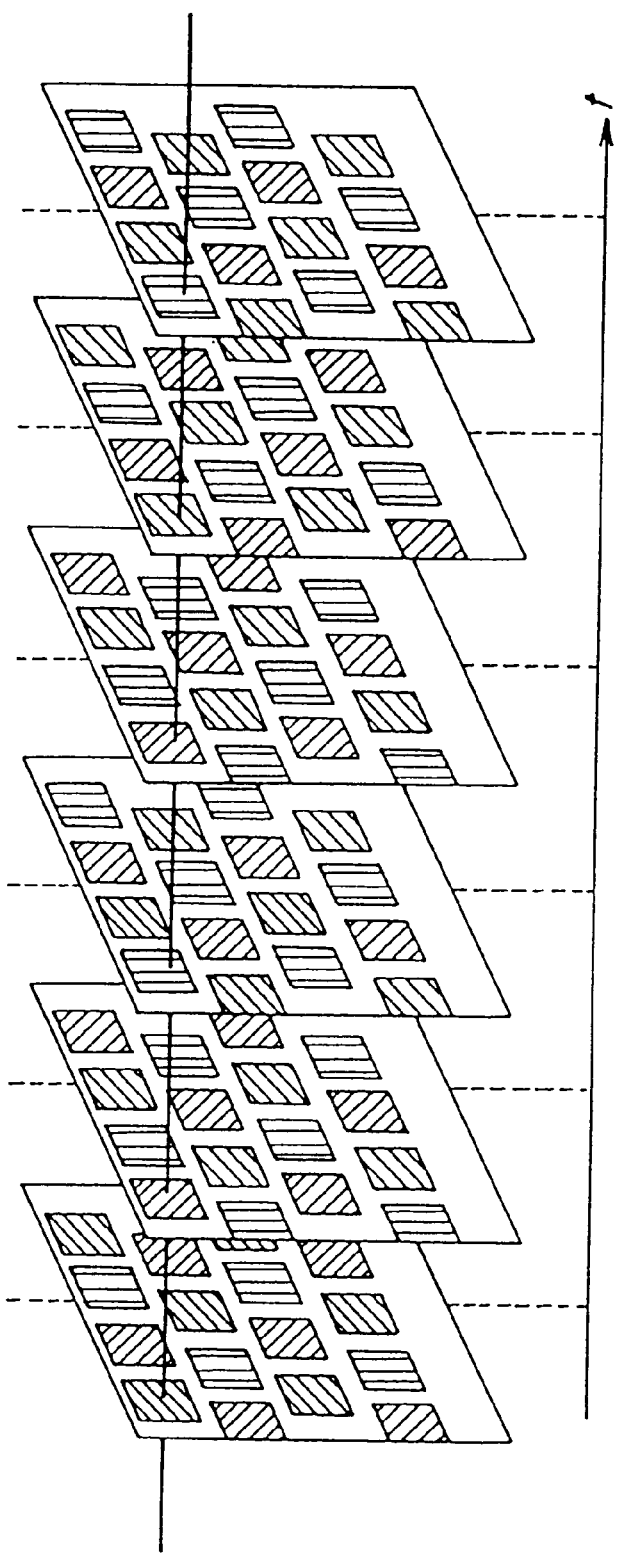
FIG. 45 is a perspective view showing a nineteenth embodiment of the display apparatus according to the present invention.

In the above respective embodiments, the pixel is shifted in the horizontal direction. In case of shifting the pixel in the horizontal direction, if the shifting period is slow, the image plane may be observed as if it flows. In case of displaying a moving picture which is moved with the same speed as that of pixel shifting, a color moire arises. Then, in a nineteenth embodiment, in the above respective embodiments, as shown in FIG. 45, the shifting amount of the pixel is changed in the following order: shifting amount: 0-shifting amount 1-shifting amount 2-shifting amount 1-shifting amount 0-shifting amount 2-shifting amount 0-shifting amount 1. In this way, the periodicity of the shifting amount of the pixel is made disordered, the flow of image plane and the generation of color moire can effectively be prevented.

Such a pixel shifting can be changed every line as in the eighteenth embodiment shown in FIG. 44, in such a manner that in case of using line type first and second polarization converting liquid crystal plates 141, 142, for example, the order of shifting amount is made as follows; shifting amount 0-shifting amount 1-shifting amount 2, for line m, and shifting amount 0-shifting amount 2-shifting amount 1, for line (m+1). In this case, the generation of flow of image plane on whole display plane can be effectively prevented and the generation of color moire can effectively be suppressed.

When such a pixel shifting is applied to HMD shown in FIG. 32, the shifting on LCD of right and left optical systems can also be changed. For example, the shifting is made in the order of shifting amount 0-shifting amount 1-shifting amount 2, for left LCD, and in the order of shifting amount 0-shifting amount 2-shifting amount 1, for right LCD. In this case, the generation of flow of image plane on whole display plane in case of viewing the image with both eyes can be effectively prevented and the generation of color moire can effectively be suppressed.

Figure 46:
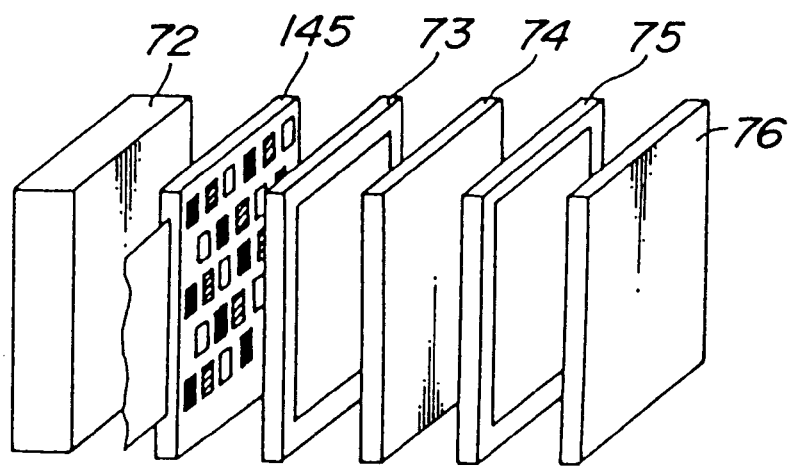
FIG. 46 is a perspective view showing a twentieth embodiment of a display apparatus according to the present invention.

In the above described respective embodiments, horizontally scanned LCD is utilized to successively display the image on the image plane vertically, but in a twentieth embodiment according to the present: invention, as shown in FIG. 46, LCD 145 having respective pixels of R, G, B which are delta-arrayed in matrix, and scanned in the vertical direction for display image, is utilized so as to successively display the images on the image plane from left to right as shown in FIG. 47. The same as in FIG. 29, also, the LCD 145 is provided with the back light 72 for generating white color light at its rear side, and with a first polarization converting liquid crystal plate 73 constituting the optical axis shifting means, a first birefringent plate 74, a second polarization converting liquid crystal plate 75, and a second birefringent plate 76 at its front side. In this embodiment, in order to scan the pixels in the horizontal direction, the shifting direction of the optical axis due to the optical axis shifting means is made a vertical direction which is different by 90 degrees to the direction of the above embodiment.

In this way, as in the above described embodiments, the images having different sampling timings by a pixel pitch are displayed on LCD 145. This LCD is subjected to a switching to shift the optical axis of respective pixels by a pixel pitch in the direction opposite to the shifting direction of the image due to the sampling timing by the optical axis shifting means in synchronism with the display of images.

According to this embodiment, the resolution of pixel row scanned at a timing of performing the pixel shifting can be increased. Generally, in case of viewing TV by the observer, as seen from convergence (viewing) point distribution shown in FIG. 48 (Television image information engineering handbook, Television society, Ohm-sha, first edition, page 45), the viewing points are positioned over center portion vertically. Therefore, for example, if the pixel shifting is performed in case of scanning the central row of LCD 145, as shown in FIG. 49, the resolution of rows at its center portion can be made highest, so that the resolution of the regions in which the observer notes can be increased.

The same construction as in the eleventh to nineteenth embodiments may be obtained by using LCD 145 scanned in the horizontal direction. In these case, the pixel shifting direction and the optical axis shifting direction opposite thereto are made row direction, respectively.

FIG. 50 shows a twenty-first embodiment of the image display apparatus according to the present invention. This embodiment is applied to a video camera. This video camera comprises an imaging system 151, a display system in which the taking image is observed, and a recording apparatus 153 for recording the picked-up image. The imaging system 151 serves to focus the light from the object (not shown) to be imaged to an imaging element 160 through a linear polarizer plate 154, a lens 155, and an optical axis shifting means consisting of a first polarization converting element 156, a first birefringent plate 157, a second polarization converting element 158, and a second birefringent plate 159. The imaging element 160 utilizes a matrix arrayed pixels of R, G, B, for example, a CCD.

The display system 152 has a display element 161 for displaying the images and serves to observe the displayed image through a displaying optical axis shifting means consisting of a third polarization converting element 162, a third birefringent plate 163, a fourth polarization converting element 164, and a fourth birefringent plate 165. The display element 161 utilizes a matrix arrayed pixels of R, G, B, for example, a CCD.

In this embodiment, the first and second polarization converting elements 156, 158 in the imaging system 151, and the third and fourth polarization converting elements 162, 164 in the display systems 152 are synchronized with and driven by the polarization converting element drive circuit 166, the image signals from the imaging element 160 are supplied to and recorded by the recording apparatus 153, while shifting the pixels in the relatively opposite direction, and are supplied to and displayed by the display element 161 through the display element drive circuit 167.

In this way, at the side of the imaging system 151, the image signals of R, G, B are successively be obtained in correspondence with respective points of the object, so that the resolution of the imaging element 160 can be increased. At the side of display system 152, the image signals of R, G, B are successively be observed in correspondence with respective points of the object, so that the resolution of the display element 161 can be increased as in the above described embodiments.

The present invention is not limited to the above described embodiments but can perform various changes or modifications. For example, when the pixels of R, G, B are arranged repeatedly in the above order, the pixels shifting by 1.5 pixel pitch are selectively performed, and the optical axis shifting by 1.5, pixel pitch is performed in the direction opposite to the pixel shifting direction in accordance therewith. In this way, for successive pictures, the observing image to which the pixel having different color is interpolated between pixels, can be obtained, so that the resolution can be increased effectively. In this case, the optical axis shifting means can be constructed by a polarization converting element and a birefringent plate.

As shown in FIG. 51, the present invention can effectively be applied in case of displaying the image by selectively performing the pixel shifting by ½ pixel pitch in the scanning direction, and in case of displaying the image by the interlace-scanning. Even in these cases, the optical axis shifting means can be constructed by a polarization converting element and a birefringent plate. In the case of interlace-scanning, the optical axis of the image may be shifted by ½ pixel pitch in the direction orthogonal to the scanning direction of the image signal on the display element, or by ½ pixel pitch in the scanning direction from the orthogonal direction, in accordance with the sampling timing of the image signal of successive fields.

What is claimed is:

1. An image display apparatus comprising:
   an image display element, having a plurality of pixels arrayed in a matrix, for displaying images by scanning the pixels with image signals representing the images;
   a first pixel shifting means, divided into a plurality of regions, for selectively shifting optical axes of portions of the images in respective ones of the regions;

a second pixel shifting means for selectively shifting the optical axes and having a shifting amount equal to a shifting amount of the first pixel shifting means;

a viewing optical system for producing a magnified image from the images and projecting the magnified image on eyes of a viewer; and a control means for controlling a position of the images displayed on the image display element in synchronism with an operation of the first and second pixel shifting means.

2. An image display apparatus comprising:

an image display element, having a plurality of pixels arrayed in a matrix, for displaying images by scanning the pixels with image signals representing the images;

a pixel shifting means for selectively shifting viewing positions of the images;

a sight line detecting means for detecting a sight line of a viewer who views the images; and a control means for controlling timing of a shifting operation performed by the pixel shifting means, based on an output of the sight line detecting means.

3. An image display apparatus comprising:

an image display element having a plurality of pixels arrayed in a matrix, for displaying images by scanning the pixels with image signals representing the images;

a pixel shifting means for selectively shifting viewing positions of the images;

an image interrupting means for selectively interrupting viewing of the images; and a control means for controlling the pixel shifting means so as to shift the viewing positions of the displayed images at shifting times, and for controlling the image interrupting means so as to allow the viewing of the images at times other than the shifting times.

4. An image display apparatus as claimed in claim 3, wherein the image signals have consecutive fields which define the shifting.

5. An image display apparatus as claimed in claim 2, wherein the pixel shifting means comprises (i) one of a ferrodielectric substance liquid crystal and an anti-ferrodielectric substance liquid crystal, and (ii) an optical anisotropy medium.

6. An image display apparatus as claimed in claim 3, wherein the pixel shifting means comprises (i) one of a ferrodielectric substance liquid crystal and an anti-ferrodielectric substance liquid crystal, and (ii) an optical anisotropy medium.

7. An image display apparatus as claimed in claim 2, wherein the image display element comprises one of a ferrodielectric substance liquid crystal and an anti-ferrodielectric substance liquid crystal.

8. An image display apparatus as claimed in claim 3, wherein the image display element comprises one of a ferrodielectric substance liquid crystal and an anti-ferrodielectric substance liquid crystal.

9. A display apparatus having a display element having a plurality of pixels arrayed in a matrix, for displaying images by scanning the pixels with image signals representing the images, the display apparatus comprising:

an optical axis shifting means for selectively shifting an optical axis of the images displayed on the display elements in an ON•OFF operation; and an image shifting means for selectively shifting the images displayed on the display elements in synchronism with the ON•OFF operation of a shift of the optical axis performed by the optical axis shifting means;

the display elements not displaying the images when the optical axis shifting means shifts the optical axis.

10. A display apparatus as claimed in claim 9, wherein the optical axis shifting means repeats the ON•OFF operation of the optical axis in an order of ON, OFF, OFF, ON.

11. A display apparatus having liquid crystal display element having a plurality of pixels arrayed in a matrix, for displaying images by scanning the pixels with image and scanning signals representing the images the apparatus comprising:

an optical axis shifting means for selectively shifting an optical axis of the images displayed on the liquid crystal display element;

an image shifting means for selectively shifting the images displayed on the liquid crystal display element in synchronism with an operation of the optical axis shifting means; and a scanning illumination means for scanning and illuminating the liquid crystal display element in synchronism with the scanning signals.

12. A display apparatus as claimed in claim 11, wherein the scanning illumination means has a scanning line width which is substantially larger than 2 times and smaller than 50 times a line width of the liquid crystal display element.

13. A display apparatus as claimed in claim 11, wherein the optical axis shifting means has first and second polarization converting element, for selectively converting a polarization of light of the images, and first and second birefringent plates for shifting the optical axis in accordance with the polarization, the polarization connecting elements and birefringent plates being arranged in an order of the first polarization converting element, the first birefringent plate, the second polarization converting element and the second birefringent plate, from a surface of the display element.

14. A display apparatus having a display element having a plurality of pixels arrayed in a matrix, for displaying images by scanning the pixels with image signals representing the images, the images having a scanning timing, the apparatus comprising:

an optical axis shifting means for selectively shifting, an optical axis of the images displayed on the display element in an ON•OFF operation having a change timing; and an image shifting means for selectively shifting the images displayed on the display element in synchronism with the ON•OFF operation of the optical axis shifting means;

the change timing of the ON•OFF operation being changed for the scanning timing of the images on the display element.

15. A display apparatus as claimed in claim 14, wherein the change timing is at substantially ⅙, ½ and ⅚ of a rewriting period of the image signals for the display element.

16. A display apparatus as claimed in claim 14, wherein the optical axis shifting means has first and second polarization converting elements for selectively converting a polarization of light of the images, and first and second birefringent plates for shifting the optical axis in accordance with the polarization, the polarization converting elements and birefringent plates arranged in an order of the first polarization converting element, the first birefringent plate, the second polarization converting element and the second birefringent plate, from a surface of the display element.

17. A display apparatus comprising:

a display element for displaying images;

an optical axis shifting means for selectively shifting an optical axis of the display element among a first optical axis, a second optical axis and a third optical axis; and an image shifting control means for selectively shifting the images displayed on the display element by a first shifting amount, a second shifting amount and a third shifting amount corresponding to the first optical axis, the second optical axis and the third optical axis in synchronism with an operation of the optical axis shifting means;

selective patterns of sequences of shifting to the first optical axis, the second optical axis and the third optical axis performed by the optical axis shifting means being successively changed.

18. A display apparatus as claimed in claim 17, wherein the selective patterns are in order of (i) the first optical axis, the second optical axis, the third optical axis, (ii) the second optical axis, the first optical axis, the third optical axis, and so on.

19. A display apparatus as claimed in claim 17, wherein the optical axis shifting means has first and second polarization converting elements for selectively converting a polarization of light, and said image shifting control means has first and second birefringent plates for shifting the optical axis in accordance with the polarization, the polarization converting elements and the birefringent plates being arranged in an order of the first polarization converting element, the first birefringent plate, the second polarization converting element and the second birefringent plate, from a surface of the display element.

20. A display apparatus having a display element having a plurality of pixels arrayed in a matrix, for displaying images by scanning the pixels with image signals representing the images, the apparatus comprising:

an optical axis shifting means for selectively shifting an optical axis of the images displayed on the display element; and an image shifting means for selectively shifting the images displayed on the display element in synchronism with an operation of the optical axis shifting means;

consecutive rows of the pixels being scanned in a horizontal direction by the image signals to display the images, and the optical axis of the images being shifted by the optical axis shifting means in a scanning direction, wherein the optical axis shifting means has first and second polarization converting elements for selectively converting a polarization of light of the images, and first and second birefringent plates for shifting said optical axis in accordance with polarization, the polarization converting elements and the birefringent plates being arranged in an order of the first polarization converting element, the first birefringent plate, the second polarization converting element and the second birefringent plate, from a surface of the display element.

21. A display apparatus having first and second display elements for displaying first images and second images on a display image plane on eyes of a viewer, respectively, said apparatus comprising:

a first optical axis shifting means for selectively shifting an optical axis of the first images displayed on the first display element in a first ON•OFF operation;

a second optical axis shifting means for selectively shifting an optical axis of the second images displayed on the second display element in a second ON•OFF operation;

a first image shifting control means for selectively shifting the first images displayed on the first display element in synchronism with the first ON•OFF operation; and a second image shifting control means for selectively shifting the second images displayed on the second display element in synchronism with the second ON•OFF operation;

the first optical axis shifting means repeating ON, OFF, ON, OFF in the first ON•OFF operation in accordance with a change of the display image plane;

the second optical axis shifting means repeating ON, OFF, ON, OFF in the second ON•OFF operation in relation to the ON, OFF, ON, OFF of the first ON•OFF operation in accordance with the change of the display image plane; and the first and second images not being displayed on corresponding ones of the first and second optical display elements at a time of changing optical axis shifting by the first and second optical axis shifting means.

22. A display apparatus having a display element divided into a plurality of regions and having a plurality of pixels arrayed in a matrix, for displaying images by scanning the pixels with image signals representing the images, the apparatus comprising:

an optical axis shifting means for selectively shifting an optical axis of portions of the images on respective ones of the regions to a first optical axis, a second optical axis and a third optical axis; and an image shifting control means for selectively shifting the images displayed on the display elements by a first shifting amount, a second shifting amount and a third shifting amount corresponding to the first optical axis, the second optical axis and the third optical axis in synchronism with an operation of the optical axis shifting means;

selective patterns of sequences of shifting to the first optical axis, the second optical axis and the third optical axis performed by the optical axis; shifting means being different in consecutive ones of the regions.

23. A display apparatus having first and second display elements for displaying first images and second images on eyes of a viewer, respectively, said apparatus comprising:

a first optical axis shifting means for selectively shifting an optical axis of the first images displayed on the first display element to a first optical axis, a second optical axis and a third optical axis;

a second optical axis shifting means for selectively shifting an optical axis of the second images displayed on the second display element to the first optical axis, the second optical axis and the third optical axis;

a first image shifting control means for selectively shifting the first images displayed on the first display element by a first shifting amount, a second shifting amount and a third shifting amount corresponding to the first optical axis, the second optical axis and the third optical axis in synchronism with an operation of the first optical axis shifting means; and a second image shifting control means for selectively shifting the second images displayed on the second display element by the first shifting amount, the second shifting amount and the third shifting amount in synchronism with an operation of the second optical axis shifting means;

selective patterns of sequences of shifting to the first optical axis, the second optical axis and the third optical axis performed by the first optical axis shifting means being different from selective patterns of sequence of shifting to the first optical axis, the second optical axis and the third optical axis performed by the second optical axis shifting means.

24. An image display apparatus as claimed in claim 4, wherein the pixel shifting means comprises (i) one of a ferrodielectric substance liquid crystal and an anti-ferrodielectric substance liquid crystal, and (ii) an optical anisotropy medium.

25. An image display apparatus as claimed in claim 4, wherein the image display element comprises one of a ferrodielectric substance liquid crystal and an anti-ferrodielectric substance liquid crystal.

26. An image display apparatus as claimed in claim 1, wherein the magnified image is a virtual image.

27. An image display apparatus as claimed in claim 1, wherein said first pixel shifting means comprises a line type liquid crystal panel including a plurality of line electrodes corresponding to respective lines of said matrix of pixels of said image display element, and said control means controls said first pixel shifting means to shift optical axes of lines of said matrix in synchronism with scanning of said lines of said matrix.

28. An image display apparatus as claimed in claim 1, wherein said control means displays pixels at three positions.

* * * * *